(12) United States Patent
Kim et al.

(10) Patent No.: US 8,380,081 B2
(45) Date of Patent: Feb. 19, 2013

(54) METHOD AND APPARATUS FOR CHANNEL ALLOCATION IN A VISIBLE LIGHT COMMUNICATION SYSTEM

(75) Inventors: Do-Young Kim, Yongin-si (KR); Eun-Tae Won, Seoul (KR); Tae-Han Bae, Seongnam-si (KR); Sun-Gi Gu, Yongin-si (KR); Jae-Seung Son, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 347 days.

(21) Appl. No.: 12/886,289

(22) Filed: Sep. 20, 2010

(65) Prior Publication Data

US 2011/0069957 A1    Mar. 24, 2011

(30) Foreign Application Priority Data

Sep. 19, 2009    (KR) .................. 10-2009-0088786
Jan. 18, 2010    (KR) .................. 10-2010-0004554

(51) Int. Cl.
*H04B 10/00* (2006.01)
(52) U.S. Cl. ....................................... 398/172; 398/154
(58) Field of Classification Search .............. 398/35, 398/58, 67, 69, 89, 98, 99, 128, 135, 154, 398/172
See application file for complete search history.

(56) References Cited

U.S. PATENT DOCUMENTS

| 7,715,885 B2 * | 5/2010 | Arunan et al. ................. 455/574 |
| 8,264,341 B2 * | 9/2012 | Jung et al. ..................... 340/531 |
| 2007/0081490 A1 | 4/2007 | Kim et al. |
| 2008/0159209 A1 | 7/2008 | Kim |

FOREIGN PATENT DOCUMENTS

| KR | 1020080019683 | 3/2008 |
| WO | WO 2008/066363 | 6/2008 |
| WO | WO 2008/093991 | 8/2008 |

* cited by examiner

*Primary Examiner* — Dalzid Singh
(74) *Attorney, Agent, or Firm* — The Farrell Law Firm, P.C.

(57) ABSTRACT

A method and apparatus for allocating resources of a Visible Light Communication (VLC) terminal in a VLC system. The VLC terminal receives a beacon message from a base station, coordinates time synchronization with the base station, searches for an available wavelength channel, constructs available wavelength channel information, and transmits an initial access request using a basic time slot channel and a basic wavelength channel. The base station considers the available wavelength channel information and a current channel allocation condition, allocates an appropriate channel, and transmits channel allocation information to the VLC terminal. The VLC terminal and the base station communicate data with each other using an allocated time slot channel included in the channel allocation information and an allocated wavelength channel included in the channel allocation information.

18 Claims, 16 Drawing Sheets

METHOD AND APPARATUS FOR CHANNEL ALLOCATION IN A VISIBLE LIGHT COMMUNICATION SYSTEM

PRIORITY

This application claims priority under 35 U.S.C. §119(a) to Korean Patent Applications filed in the Korean Industrial Property Office on Sep. 19, 2009 and Jan. 18, 2010, and assigned Serial Nos. 10-2009-0088786 and 10-2010-0004554, respectively, the contents of which are incorporated herein by references.

BACKGROUND OF THE INVENTION

1. Field of the Invention

The present invention relates generally to Visible Light Communication (VLC), and more particularly, to a method and an apparatus for allocating multiple channels in a VLC system.

2. Description of the Related Art

Currently, research into visible light wireless communication using a visible Light Emitting Diode (LED) is being conducted by various companies and laboratories.

FIG. 1 illustrates a conventional VLC system.

Referring to FIG. 1, the VLC system includes a light source 10, which includes an LED or a Laser Diode (LD). The light source 10 transmits and receives data using visible light, while simultaneously functioning a light. The VLC system also includes a communication control device (not shown) for processing the data transmitted and received through the light source 10, and a VLC terminal 20, which includes a VLC transmitting/receiving module for transmitting/receiving data with the light source 10. The VLC terminal 20 may be a mobile terminal, such as a mobile phone or a PDA, or a fixed terminal, such as a desk-top computer. In addition, the VLC is combined with communication systems that use different wired/wireless communication media, so that it is possible to be more efficiently used.

Generally, when a VLC system is to provide service using the VLC in a wide space, multiple light sources are installed within the corresponding space, according to a service range of each light source.

FIGS. 2A to 2C illustrate service area conditions of two light sources 30 and 40.

Referring to FIGS. 2A to 2C, when the multiple light sources 30 and 40 are installed in predetermined intervals, a service area of each of the actual light sources can be represented in three cases.

Referring to FIG. 2A, the service areas of the light sources 30 and 40 overlap.

Referring to FIG. 2B, boundaries of the service areas of the light sources 30 and 40 are in contact with each other.

Referring to FIG. 2C, a non-service area is created between the service areas of the light sources 30 and 40.

Among FIGS. 2A to 2C, FIG. 2B is an ideal condition, but it is difficult to actually achieve this condition. Therefore, service areas according to multiple light sources generally include either an overlapped area in which the service areas are partially overlapped, as illustrated in FIG. 2A, or include a non-service area between the two service areas, as illustrated in FIG. 2C.

However, when the light source 30 and the light source 40 provide different kinds of services, data transmitted by the two services can collide with each other in a collision region, interfering with or even preventing the regular service. Further, normal VLC is not possible at all in the non-service area.

As such, in order to provide the conventional VLC by the adjacent multiple light sources, there is a limitation in that the adjacent multiple light sources have to provide all of the users with the same service.

SUMMARY OF THE INVENTION

Accordingly, the present invention has been made to solve at least the above-described problems occurring in the prior art, and an aspect of the present invention is to provide a VLC method and a VLC system capable of providing various services for each user, when the VLC service is provided using multiple adjacent light sources.

Another aspect of the present invention is to provide a VLC method and a VLC system capable of VLC, even in an area in which service areas of multiple light sources providing different services overlap.

Another aspect of the present invention is to provide a VLC method and a VLC system capable of efficiently using the light sources of the VLC system.

In accordance with an aspect of the present invention, a method is provided for allocating a channel of a VLC terminal in a VLC system. The method includes receiving a beacon message; coordinating time synchronization with a base station; searching for a currently available wavelength channel; constructing available wavelength channel information; transmitting an initial access request including the available wavelength channel information to the base station using a basic time slot channel and a basic wavelength channel; receiving channel allocation information from the base station; and communicating data with the base station using an allocated time slot channel included in the channel allocation information and an allocated wavelength channel included in the channel allocation information.

In accordance with another aspect of the present invention, an apparatus for allocating a channel of a Visible Light Communication (VLC) terminal is provided. The apparatus includes a light emitting device; a photosensitive device; and a control unit for receiving a beacon message received through the photosensitive device and coordinating time synchronization with a base station, searching for a currently available wavelength channel and constructing available wavelength channel information, transmitting an initial access request including the available wavelength channel information to the base station through the light emitting device using a basic time slot channel and a basic wavelength channel, receiving channel allocation information from the base station through the photosensitive device, and communicating data with the base station using an allocated time slot channel included in the channel allocation information and an allocated wavelength channel included in the channel allocation information.

In accordance with another aspect of the present invention, a method is provided for allocating a channel of a base station including a light source in a Visible Light Communication (VLC) system. The method includes broadcasting a beacon message including a frame synchronization signal; receiving an initial access including available wavelength channel information from a VLC terminal; allocating a time slot channel and a wavelength channel corresponding to the VLC terminal, according to the available wavelength channel information and a current channel allocation condition; transmitting channel allocation information including information of the allocated time slot channel and the allocated wavelength channel to the VLC terminal; and communicating data with the VLC terminal using the allocated time slot channel included in the channel allocation information and the allocated wavelength channel included in the channel allocation information.

In accordance with another aspect of the present invention, an apparatus for allocating a channel of a base station in a Visible Light Communication (VLC) system is provided. The apparatus includes a light source; and a base station control unit for broadcasting a beacon message including a frame synchronization signal through the light source, receiving an initial access including available wavelength channel information from a VLC terminal through the light source, allocating a time slot channel and a wavelength channel corresponding to the VLC terminal, according to the available wavelength channel information and a current channel allocation condition, transmitting channel allocation information including information of the allocated time slot channel and the allocated wavelength channel to the VLC terminal through the light source, and communicating data with the VLC terminal using the allocated time slot channel included in the channel allocation information and the allocated wavelength channel included in the channel allocation information.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
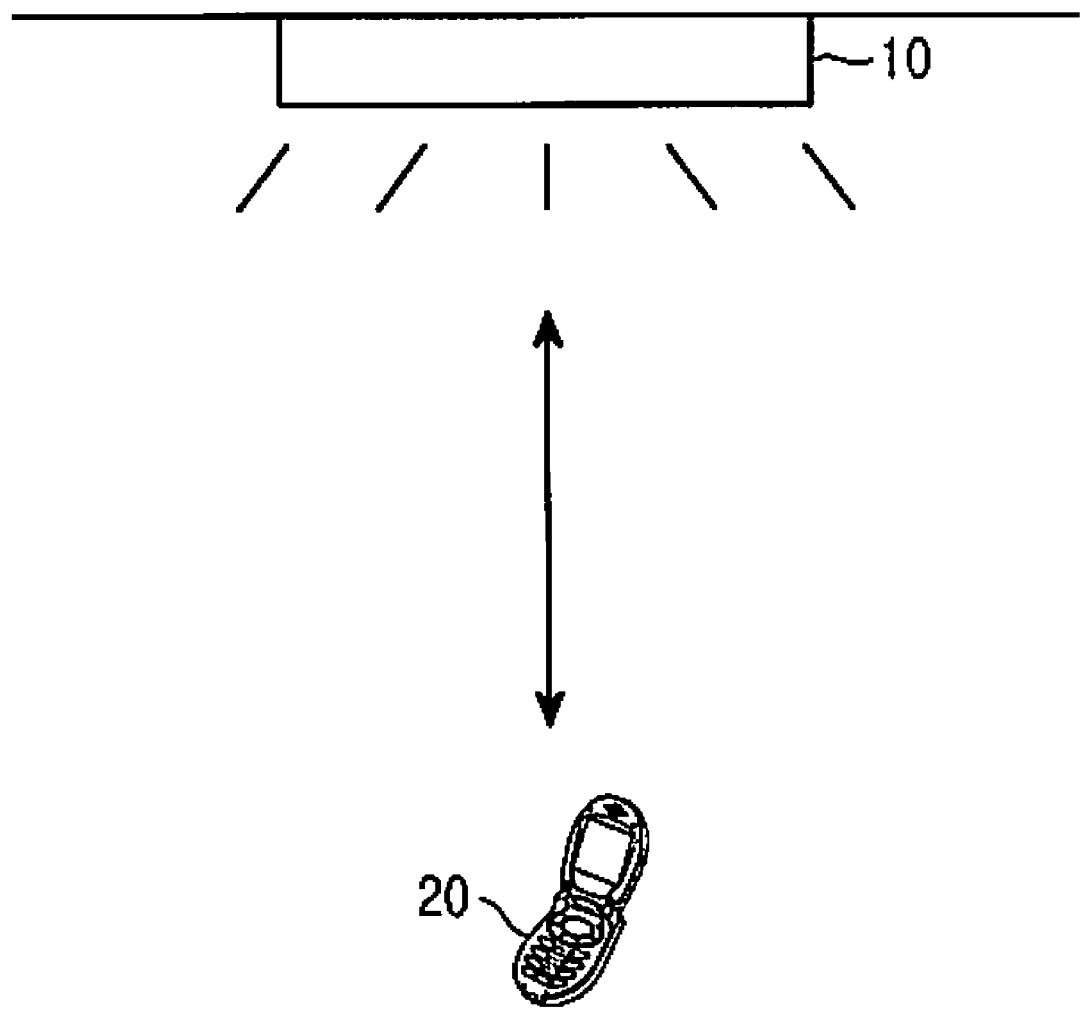
FIG. 1 illustrates a conventional VLC system.
Figure 2A:
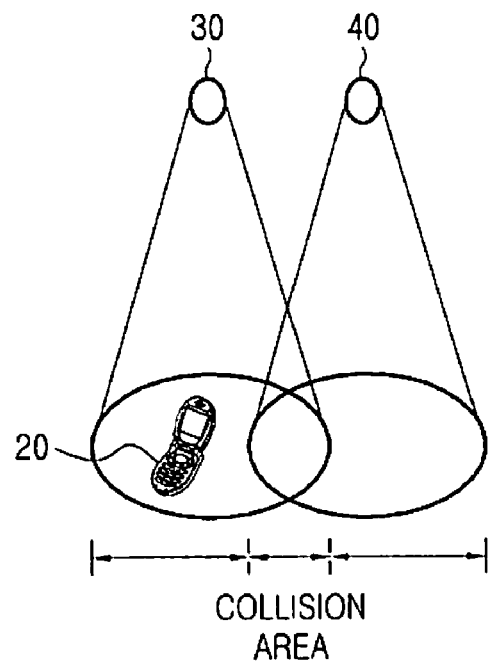
FIGS. 2A to 2C illustrate conventional service area conditions of two light sources.
Figure 2B:
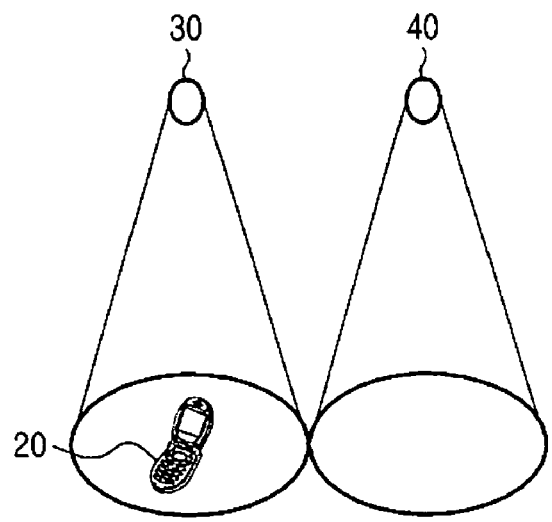
Figure 2C:
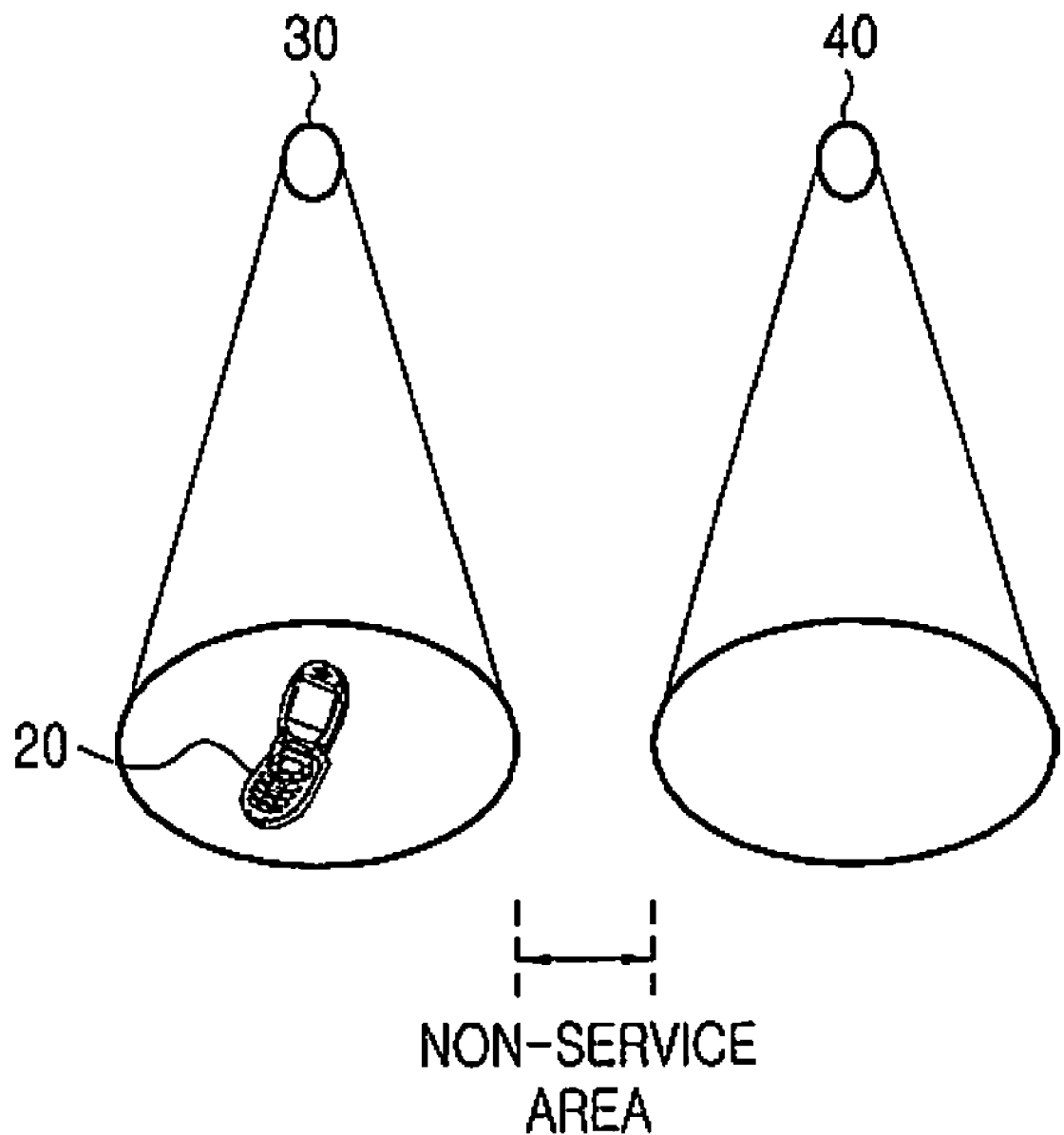

Hereinafter, various embodiments of the present invention will be described with reference to the accompanying drawings. In the following description, the same elements will be designated by the same reference numerals although they are shown in different drawings. Further, various specific definitions found in the following description are provided only to help general understanding of the present invention, and it will be understood by those skilled in the art that various changes in form and details may be made therein without departing from the spirit and scope of the present invention.

In accordance with an embodiment of the present invention, transmission of data by a VLC system uses a Time Division Multiplexing (TDM) scheme and a wavelength division multiplexing scheme. That is, according to an embodiment of the present invention, when different data is transmitted, a transmission frame is divided into multiple time slots and a transmission channel in the unit of the time slot or in the frame unit is divided into multiple wavelength channels, each of which has a specific frequency band, so that different data is transmitted through the different channels, respectively, thereby achieving the multiplexing of the channel and efficiently using limited resources.

In accordance with an embodiment of the present invention, a time slot channel and a wavelength channel are allocated for each user of the VLC, each user service, or each transmitted data according to contents, so that it is possible to efficiently transmit data through multiple channels. Further, the allocation of the time slot channel and the wavelength channel may be dynamically changed according to the characteristic of the user service or the communication environment during the performance of the same user service.

Generally, an entire range of the visible light wavelength used in VLC is approximately 380 to 780 nm, and the number of effective wavelength bands that can be used as a wavelength channel has a maximum of 13. However, the number of wavelength channels to be divided can vary in consideration of several factors. For example, the wavelength band can be divided into 6 wavelength channels as represented in Table 1 below.

TABLE 1

| | Ch | | | | | |
| --- | --- | --- | --- | --- | --- | --- |
| | red | orange | yellow | green | blue | violet |
| Wavelength band | 700-610 nm | 610-590 nm | 590-570 nm | 570-500 nm | 500-450 nm | 450-400 nm |

When the VLC system according to an embodiment of the present invention uses 6 divided wavelength channels as shown in Table 1, it may be possible to transmit different data through each of the 6 wavelength channels per a single time slot channel.

Figure 3:
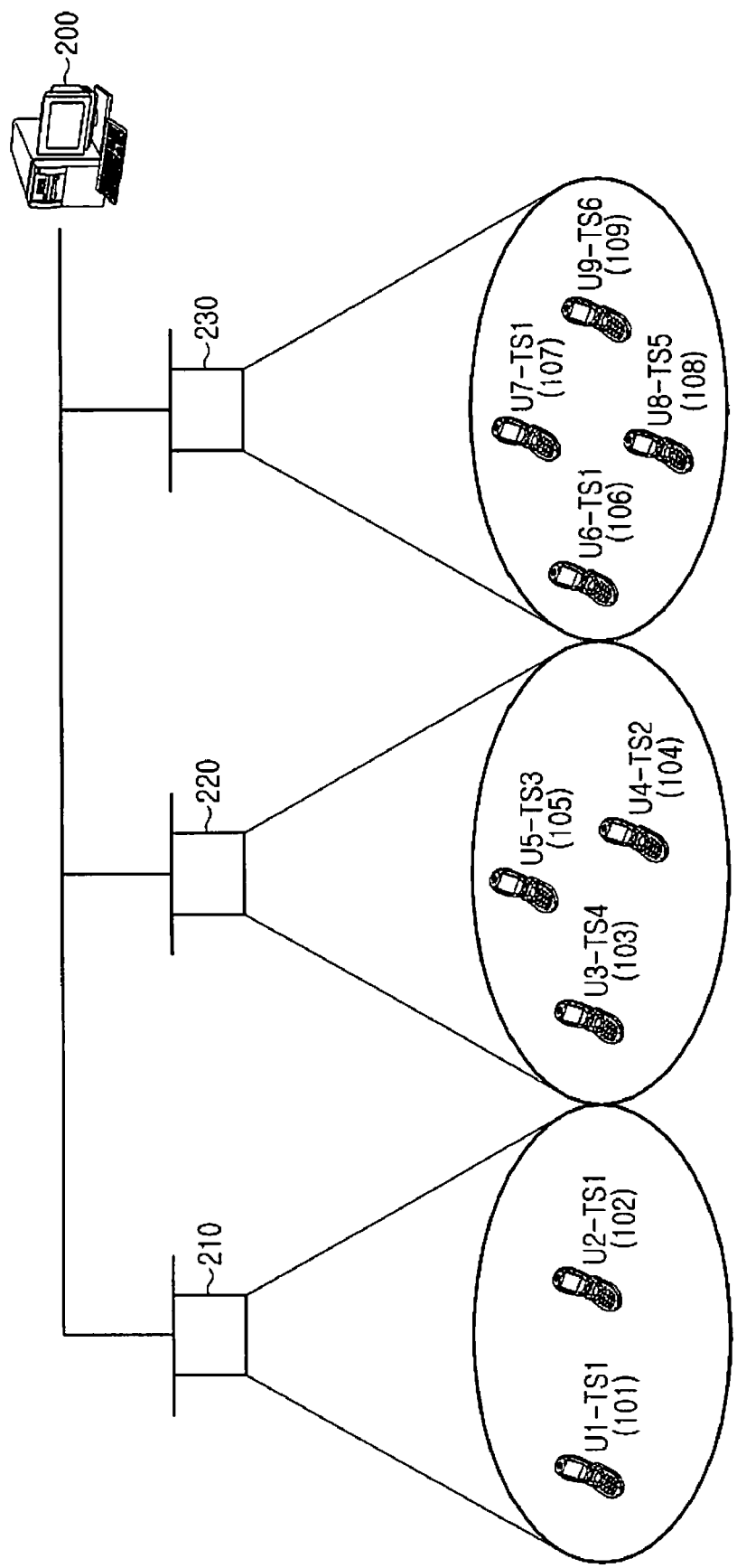
FIG. 3 illustrates a VLC system according to an embodiment of the present invention.

FIG. 3 illustrates a VLC system according to an embodiment of the present invention, which is capable of channel multiplexing, as described above.

As illustrated in FIG. 3, the VLC system includes VLC terminals 101, 102, 103, 104, 105, 106, 107, 108, and 109, light sources 210, 220, and 230, and a communication control device 200. Each of the VLC terminals 101, 102, 103, 104, 105, 106, 107, 108, and 109 is located in one of the service areas of the light sources 210, 220, and 230 and receive a beacon message transmitted from one of the light sources 210, 220, and 230. Further, the VLC terminals 101, 102, 103, 104, 105, 106, 107, 108, and 109 coordinate time synchronization using a frame synchronization included in the beacon message and transmit an initial access to the corresponding light source 210, 220, and 230 using a common wavelength channel of a predetermined common time slot channel. The VLC terminals 101, 102, 103, 104, 105, 106, 107, 108, and 109 include available wavelength channel information, which is information of a wavelength channel available for the VLC terminals, in the initial access. This prevents a wavelength channel that is unavailable for the VLC terminals 101, 102, 103, 104, 105, 106, 107, 108, and 109 from being allocated.

Further, when the VLC terminals 101, 102, 103, 104, 105, 106, 107, 108, and 109 receive channel allocation information including information of the time slot channel and the wavelength channel having been allocated to them through the light sources 210, 220, and 230, the VLC terminals 101, 102, 103, 104, 105, 106, 107, 108, and 109 set the allocated wavelength channel. Thereafter, the VLC terminals 101, 102, 103, 104, 105, 106, 107, 108, and 109 communicate data according to the VLC using the wavelength channel set in the time slot channel having been allocated to them.

Each of the light sources 210, 220, and 230 has a light resource IDentification ID that is uniquely allocated for each light source, and transmits transmission data received from the communication control device 200 to the VLC terminals 101, 102, 103, 104, 105, 106, 107, 108, and 109 positioned in its service area. Each of the light sources 210, 220, and 230 transmits data received from each of the VLC terminals 101, 102, 103, 104, 105, 106, 107, 108, and 109 to the communication control device 200. The light source inserts its light source ID in the received data and transmits the received data to the communication control device 200. Further, each of the light sources 210, 220, and 230 periodically broadcasts a beacon message including frame synchronization, to enable a VLC terminal positioned in the service area of each light source to coordinate the synchronization.

The communication control device 200 processes data to be transmitted to the VLC terminals 101, 102, 103, 104, 105, 106, 107, 108, and 109 according to the VLC, transmits the processed data to the VLC terminals 101, 102, 103, 104, 105, 106, 107, 108, and 109 through the light source 210, 220, and 230, and processes data received through the VLC terminals 101, 102, 103, 104, 105, 106, 107, 108, and 109 through the light source 210, 220, and 230.

The communication control device 200 manages the light source IDs of all of the light sources 210, 220, and 230 connected with the communication control device 200, and maps and manages a cell including at least one light source for the data transmission. The cell is determined according to a user service to be provided from the corresponding light source. Accordingly, a size, a location, or a form of the cell is not fixed. Further, the number of light sources included in a single cell is not fixed, but obviously, in order to perform VLC, each cell has to minimally include at least one light source.

A new cell is formed according to a user service or contents to be transmitted, a size and a form of the previously formed cell is changed, and the formation itself of the cell is cancelled, and these operations are performed through a grouping process for the light source. Therefore, the communication control device 200 stores cell pattern information.

According to an embodiment of the present invention, the communication control device 200 manages a time slot channel and a wavelength channel, and allocates a specific time slot channel to be used by each of the VLC terminals 101, 102, 103, 104, 105, 106, 107, 108, and 109 and a wavelength channel to be used in the specific time slot channel. The time slot channels allocated to the VLC terminals 101, 102, 103, 104, 105, 106, 107, 108, and 109 are classified as being uplink or downlink, but it is preferable that a wavelength channel is the same in the uplink and the downlink.

For channel allocation, the communication control device 200 refers to various factors, such as a current channel allocation condition, a kind of transmission data, a kind of service mode, a kind of data transmission mode, available wavelength channel information of a corresponding VLC terminal at the allocation time, etc., and allocates an appropriate time slot channel and wavelength channel. For example, the service mode includes an Information Broadcasting (IB) mode, a Visible Local Area Network (VLAN) mode, and a peer to peer communication mode, and the data transmission mode includes a broadcasting mode, a multicasting mode, and a unicasting mode.

Further, the communication control device 200 considers the various factors described above when allocating the wavelength channel and determines whether to allocate an individual wavelength channel or a hopping pattern to a corresponding VLC terminal. When the communication control device 200 allocates the hopping pattern, the communication control device 200 inserts an indicator indicating that the hopping pattern is included in channel allocation information.

The allocation of the individual wavelength channel refers to the designation of at least one wavelength channel to be continuously used for the time slot channel having been allocated to the corresponding VLC terminal. When the number of allocatable wavelength channels is sufficient or the communication control device 200 is able to fixedly allocate a specific wavelength channel to the corresponding VLC terminal for a long time, it is preferable to allocate the individual wavelength channel.

In allocating the wavelength channel by the communication control device 200, if a light source has another light source adjacently located around the light source, it is preferred that the wavelength channels allocated to the adjacent light sources have wavelength bands that are not adjacent to each other, in order to prevent possible interference between the adjacent light sources.

For example, as illustrated in FIG. 3, if a kind of service provided from each of the light source 210, the light source 220, and the light source 230 are is different, the time slot channels or the wavelength channels used in each of the light source 210, the light source 220, and the light source 230 is also different. If the time slot channels used in each of the light source 210, the light source 220, and the light source 230 are identical, the communication control device 200 allocates a different kind of wavelength channel to each of the light sources 210, 220, and 230, so that it is possible to transmit a different kind of data. Accordingly, it is preferred that the wavelength band of the wavelength channel allocated in the first light source 210 is not adjacent to the wavelength band of the wavelength channel allocated in the second light source 220 as possible, so as to decrease possible channel interference.

The hopping pattern refers to a varying pattern of a wavelength channel formed through differently allocating a wavelength channel, which a single VLC terminal is to use in an allocated time slot channel, for each time slot unit or frame unit. The hopping pattern is allocated when the number of allocatable wavelength channels is small or the communication control device 200 is not able to fixedly allocate a wavelength channel to the corresponding VLC terminal, and it is possible to allocate multiple hopping patterns to a single VLC terminal.

For example, when there are many starts and ends of the data service or many movements of a VLC terminal located in a service area of a corresponding light source or cell, the variation of the wavelength channel allocated to the adjacent VLC terminal increases. Therefore, the probability of generating interference between the wavelength channels will increase or a kind of available wavelength channel is occasionally changed. In this respect, even though the same time slot channel is used, if the wavelength channel to be used is appropriately changed according to an actual use time of the time slot channel, it is possible to decrease the interference and efficiently use the resource. Therefore, an embodiment of the present invention forms various hopping patterns and allocates an appropriate hopping pattern to the VLC terminal.

Figure 10:
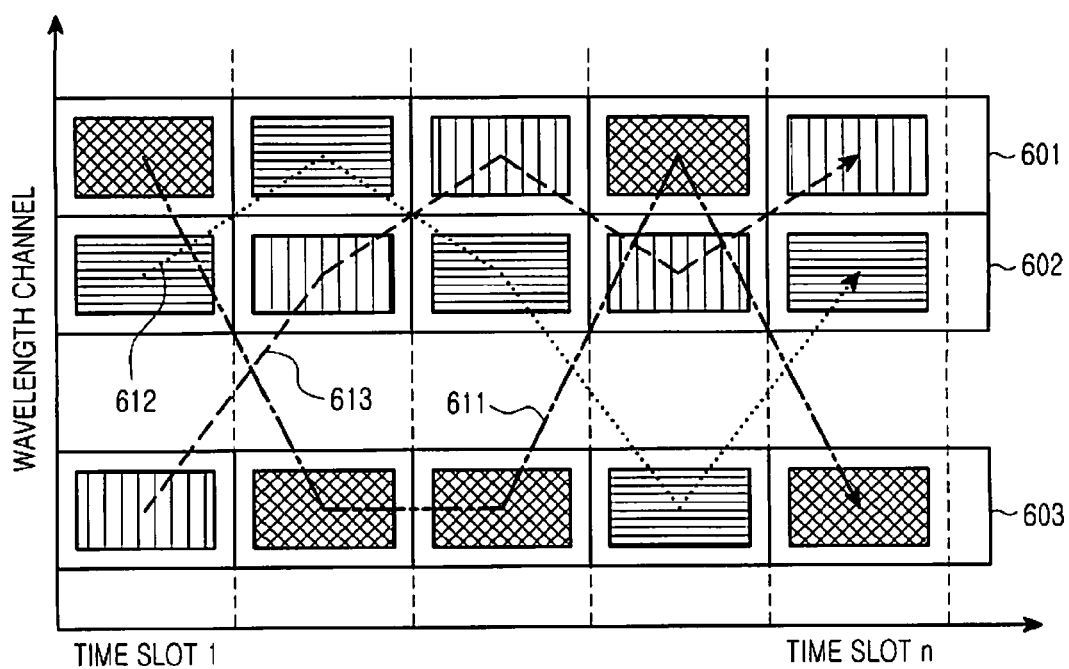
FIG. 10 is a graph illustrating a hopping pattern according to an embodiment of the present invention.

FIG. 10 is a graph illustrating a hopping pattern according to an embodiment of the present invention.

More specifically, FIG. 10 illustrates a first hopping pattern 611, a second hopping pattern 612, and a third hopping pattern 613, where a Red (R) channel 601, a Blue (B) channel 602, and a Green (G) channel 603 are used for the wavelength channel and the allocated wavelength channel is changed in the unit of the time slot. When a single wavelength hopping is performed according to each frame/time slot, the communication can be performed without interference.

Further, when interference is generated in a wavelength and a channel in which a single user communicates, it is not possible to use the wavelength and the channel allocated to the single user, thereby failing to provide the data service. Therefore, if the hopping pattern as illustrated in FIG. 10 is used, it is possible to provide all users belonging to the communication link with the same communication opportunity, thereby improving the capacity of the entire communication system in the QoS aspect. Further, it is possible to periodically allocate a different wavelength channel, so that the user can communicate, without communication failure due to the communication link problem.

The hopping pattern can be pre-defined. Predefined hopping patterns include pattern IDs corresponding to the hopping patterns, and the pattern IDs can be managed in the form of a hopping pattern table. The hopping pattern table includes pre-defined hopping patterns and pattern IDs corresponding to each of the hopping patterns, and light source IDs using each of the hopping patterns.

For example, assuming that the used wavelength channels are the R channel, the G channel, and the B channel, the hopping table can be represented by Table 2 below.

In Table 2, S_ID refers to a light source ID and represents a light source to which a corresponding hopping pattern is applied. Table 2 represents only a part of a complete hopping table.

TABLE 2

| Pattern ID<br>Frame/time slot | 001<br>S_ID 1 | 011<br>S_ID 2 | 101<br>S_ID3 |
|---|---|---|---|
| 1 | R | G | B |
| 2 | B | G/R | B |
| 3 | G | R/B | G |
| 4 | G/R | B | G/R |
| 5 | G/B | R | G/B |
| 6 | R/B | G | R/B |
| 7 | G | B | R |
| 8 | B | R | G |
| 9 | R | G/B | R |

In defining the hopping pattern, in order to prevent channel interference between a light source to which the hopping pattern is applied, and an adjacent light source, it is preferable to define the hopping pattern in such a manner that each of the wavelength channels allocated to each of the light sources has a wavelength band that is not adjacent to each other.

For example, the wavelength channel to be included in a hopping pattern 001 is a wavelength channel not generating interference in a light source S_ID 2, which is an adjacent light source of a light source S_ID 1.

A hopping pattern table is used when the communication control device 200 transmits information of the allocated wavelength channel to the VLC terminal 100. That is, when the communication control device 200 allocates a wavelength channel using the hopping pattern, it is possible to indicate a kind of allocated wavelength channel by using the pattern ID, and thus the VLC terminal 100 can recognize a hopping pattern according to the pattern ID. When the communication control device 200 transmits information of the hopping pattern, i.e. the pattern ID, to the VLC terminal 100, the VLC terminal 100 performs the hopping of the wavelength channel in the frame/time slot unit of the data transmission.

Referring to Table 2, when the VLC terminal 100 is located in a service area of a light source S_ID 1 and receives a hopping pattern 001, the VLC terminal 100 performs the hopping of the wavelength channel in the frame/time slot unit according to a sequence of the wavelength channel of the hopping pattern 001. That is, the light source S_ID 1 provides the data service by using the R channel in No. 1 frame/time slot, the B channel in No. 2 frame/time slot, the G channel in No. 3 frame/time slot, the G and R channels in No. 4 frame/time slot, the G and B channels in No. 5 frame/time slot, the R and B channels in No. 6 frame/time slot, the G channel in No. 7 frame/time slot, the B channel in No. 8 frame/time slot, and the R channel in No. 9 frame/time slot, so that the VLC terminal 100 also hops the transmission/reception channel in the corresponding frame/time slot in accordance with the channel pattern.

For example, the VLC terminal 100 transmits/receives data using the R channel of the time slot channel allocated to the VLC terminal 100 in the No. 1 frame, and transmits/receives data using the B channel of the time slot channel allocated to the VLC terminal 100 in the No. 2 frame in a next sequence. At least two wavelength channel resources are allocated in the Nos. 4, 5, and 6 frame/time slots, but it is possible to selectively allocate a single wavelength or two wavelengths. In the actual communication environment, frame/time slot Nos. 1, 2, 3, 7, 8, and 9 using a single wavelength channel for the hopping are appropriate. As the number of available wavelengths and channels increases, the combination of the hopping pattern varies.

The communication control device 200 stores and manages channel allocation condition information, and when the channel allocation is completed, the communication control device 200 transmits channel allocation information including information of the allocated time slot channel and the allocated wavelength channel to the corresponding VLC terminal. The channel allocation may be dynamically changed according to the communication environment and be transferred to the corresponding VLC terminal in every change time. The channel allocation information is referred to when the communication control device 200 transmits the data to the corresponding VLC terminal so that the relevant light source can be appropriately driven.

Figure 4:
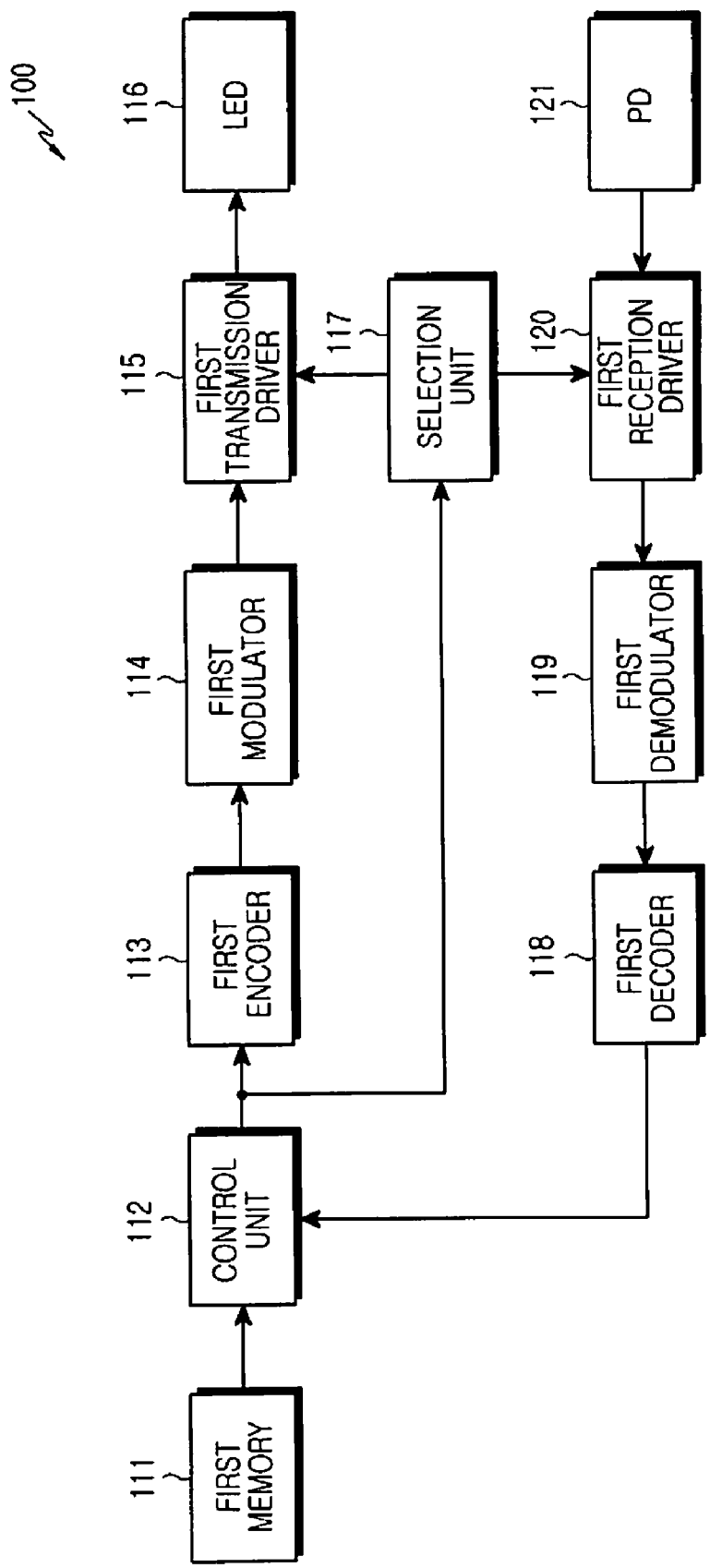
FIG. 4 is a block diagram illustrating a VLC terminal according to an embodiment of the present invention.

FIG. 4 is a block diagram illustrating a VLC terminal according to an embodiment of the present invention.

Referring to FIG. 4, the VLC terminal 100 includes a first memory 111, a control unit 112, a first encoder 113, a first modulator 114, a first transmission driver 115, an LED 116, a selection unit 117, a first decoder 118, a first demodulator 119, a first reception driver 120, and a PhotoDiode (PD) 121.

The control unit 112 processes data for the data communication, i.e., transmission and reception, according to the VLC, controls the first encoder 113, the first decoder 118, and the selection unit 117, and controls the general operation of the VLC terminal 100.

The first encoder 113 encodes transmission data input from the control unit 112 and outputs the encoded data to the first modulator 114. The first modulator 114 modulates transmission data and outputs the modulated data to the first transmission driver 115.

The first transmission driver 115, serving as a driver of the LED 116, optically modulates transmission data input from the first modulator 114 and drives the LED 116 according to a wavelength band corresponding to a wavelength channel selected by the selection unit 117.

The LED 116, i.e., a light emitting device, transfers the transmission data to an outside apparatus using an optical signal, and is driven by the first output driver 115. The type of light emitting device that may be included in the VLC terminal can vary and each light emitting device can support a different wavelength band according to characteristics of the respective light emitting device. Therefore, a kind of wavelength channel available according to the wavelength characteristic of the light emitting device included in the VLC terminal is limited.

For example, for LED 116, the wavelength band capable of light-emitting depends on the type of LED that LED 116 is. Herein, it is assumed herein that the wavelength channels supported by the LED 116 are the R channel, the G channel, and B channel.

The PD 121 is a photosensitive device for sensing an optical signal transferred from an outside apparatus, and receives an optical signal including reception data from a light source, converts the received optical signal to an electric signal, and outputs the converted electric signal to the first reception driver 120. Like LED 116, the type of PD that is used for PD 121 can vary and can have different wavelength bands. Generally, a wavelength band supportable by the light emitting device and a wavelength band supportable by the photosensitive device included in the single VLC terminal are similar, so that a kind of available wavelength channel may be identical. Herein, it is assumed that the PD 121 can sense the R channel, the G channel, and the B channel.

The first reception driver 120, serving as a driver for the PD 121, coordinates a wavelength detection band of the PD 121 according the wavelength band corresponding to the wavelength channel selected by the selection unit 117. Further, the first reception driver 120 outputs an electric signal input from the PD 121 to the first demodulator 119.

The first demodulator 119 demodulates the electric signal input from the first reception driver 120 to data according to the optical wireless communication scheme, to output reception data to the first decoder 118.

The first decoder 118 decodes the inputted reception data and outputs the decoded data to the control unit 112 and the control unit 112 appropriately processes the reception data input from the first decoder 118.

The first memory 111 stores a program for processing and controlling, reference data, various renewable data for storage, etc., and is provided as working memory of the control unit 112. Further, according to the embodiment of the present invention, the first memory 111 stores a channel grouping table. The channel grouping table includes all of the channel groups generated through the grouping of at least one wavelength channel and channel IDs corresponding to each of the channel groups, with respect to each of the wavelength channels available in the VLC system. For example, when it is assumed that the wavelength channels available in the VLC system are the R channel, the G channel, and the B channel, the channel grouping table can be represented as Table 3 below.

In Table 3, channel ID 1, i.e., "000", refers to the grouping of the R channel, the G channel, and the B channel, and channel ID 3, i.e., "010", refers to the grouping of the R channel and the B channel.

TABLE 3

| Channel ID | bit | R channel | G channel | B channel |
|---|---|---|---|---|
| 1 | 000 | ○ | ○ | ○ |
| 2 | 001 | ○ | ○ | X |
| 3 | 010 | ○ | X | ○ |
| 4 | 011 | X | ○ | ○ |
| 5 | 100 | ○ | X | X |
| 6 | 101 | X | ○ | X |
| 7 | 110 | X | X | ○ |
| 8 | 111 | X | X | X |

The channel grouping table is used when the VLC terminal 100 transmits available wavelength channel information, or the communication control device 200 transmits information of the wavelength channel allocated to the VLC terminal 100. That is, the VLC terminal 100 can indicate a kind of available wavelength channel by using a channel ID and the communication control device 200 also can indicate a kind of allocated wavelength channel by using a channel ID.

The first memory 111 can store a hopping pattern table like that shown in Table 2 and the channel allocation information. The channel allocation information is information of a time slot channel and a wavelength channel allocated to the VLC terminal 100, and can be renewed whenever the allocated channel is changed or channel allocation information is received. When the channel allocation is cancelled, the channel allocation information is deleted.

Further, the first memory 111 can store available wavelength channel information. The available wavelength channel information refers to information of a wavelength channel available in the VLC terminal 100. The basic wavelength channel available in the VLC terminal 100 is determined according to a wavelength band of the LED 116 physically included in the VLC terminal 100, but the wavelength channel that can be actually used, depending on occasions, may be changed according to the peripheral communication environment. For example, interference may be generated in a specific wavelength channel according to an occupancy degree of each of wavelength bands existing in a peripheral light of the current VLC terminal 100. Otherwise, interference may be generated in a specific wavelength channel according to a communication condition of another adjacent VLC terminal. Accordingly, the control unit 112 recognizes a wavelength characteristic sensed in the peripheral light by using the PD 121, to recognize the actually available wavelength channel, constructs available wavelength channel information, and stores the constructed wavelength channel information in the first memory 111. The wavelength channel information may be periodically renewed or be constructed as necessary.

The selection unit 117 selects the LED 116, which the first transmission driver 115 is to drive, according to the control of the control unit 112 and selects a wavelength band, which the first reception driver 120 is to filter.

The control unit 112 controls the selection unit 117 according to the allocated wavelength channel included in the channel allocation information. If the wavelength channel allocated to the VLC terminal 110 is in a type of individual wavelength channel, information of the allocated wavelength channel included in the channel allocation information may be indicated as the channel ID. For this reason, the control unit 112 controls the selection unit 117 to set the wavelength channel corresponding to the channel ID included in the channel allocation information of the time slot channel allocated to the VLC terminal 100 in the LED 116 and the PD 121. However, if the wavelength channel allocated to the VLC terminal 110 is the hopping pattern, information of the allocated wavelength channel included in the channel allocation information may be indicated as the pattern ID. Accordingly, the control unit 112 controls the selection unit 117 such that corresponding wavelength channels are set and hopped in the LED 116 and the PD 121 time slot by time slot or frame by frame, according to the hopping pattern corresponding to the pattern ID included in the channel allocation information of the time slot channel allocated to the VLC communication terminal 110.

Figure 5:
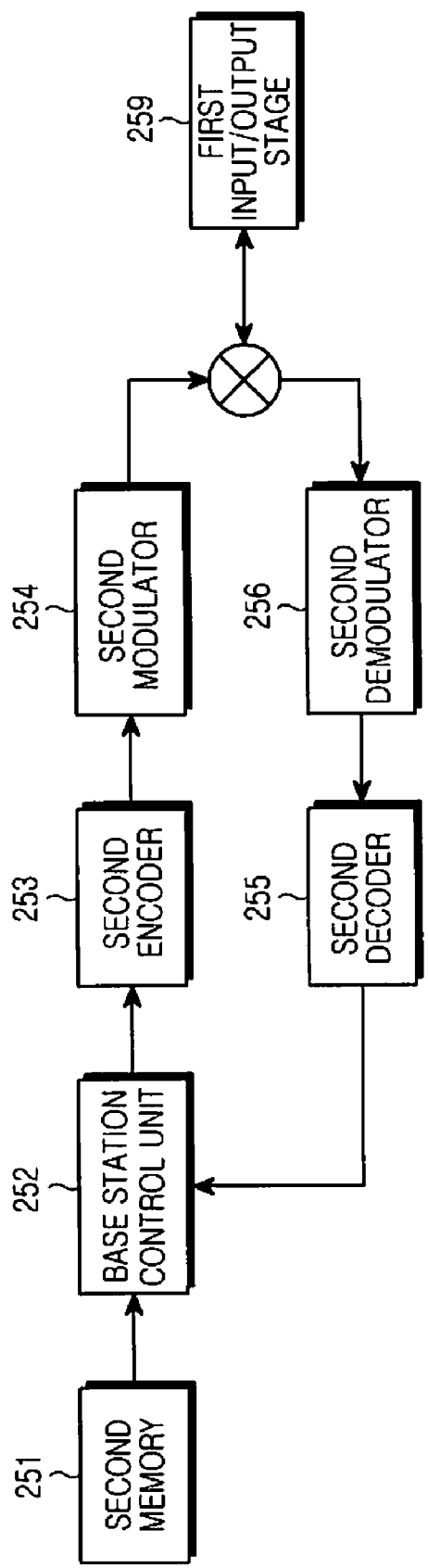
FIG. 5 is a block diagram illustrating a communication control device according to an embodiment of the present invention.
Figure 6:
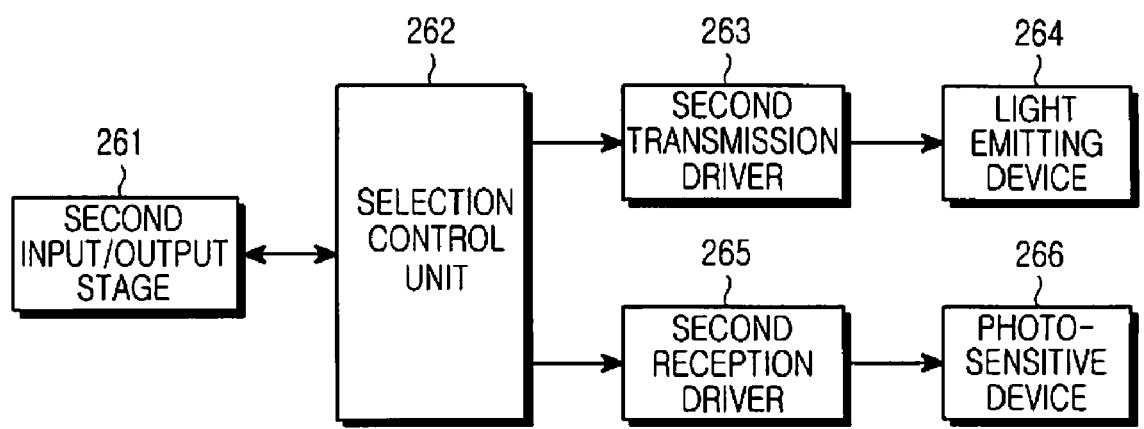
FIG. 6 is a block diagram illustrating a light source according to an embodiment of the present invention.

FIG. 5 is a block diagram illustrating a communication control device according to an embodiment of the present invention, and FIG. 6 is a block diagram illustrating a light source according to an embodiment of the present invention.

A light source connected to the communication control device 200 is operated and managed under the control of the communication control device 200 so that the light source is physically discriminated from the communication control device 200, but can be connected to the communication control device 200 through a power line, a data cable, etc., or wirelessly communicate. Therefore, in the following description, a synthetic unit including the communication control device 200 and the light sources 210, 220, and 230 connected to the communication control device 200 is referred to as a base station.

Referring to FIG. 5, the communication control device 200 includes a second memory 251, a base station control unit 252, a second encoder 253, a second modulator 254, a second decoder 255, a second demodulator 256, and a first input/output stage 259.

Referring to FIG. 6, the light source 210 includes a second input/output stage 261, a selection control unit 262, a second transmission driver 263, a light emitting device 264, a second reception driver 264, and a photosensitive device 266.

The second encoder 253, the second modulator 254, the second decoder 255, the second demodulator 256, the second transmission driver 263, the second reception driver 265, the light emitting device 264, the photosensitive device 266, and the selection control unit 262 operate and function similar with the first encoder 113, the first modulator 114, the first decoder 118, the first demodulator 119, the first transmission driver 115, the first reception driver 120, the LED 116, the PD 121, and the selection unit 117, respectively.

The first input/output stage 259 and the second input/output stage 261 control the communication of data between the communication control device 200 and the light source 210 and may include a power line, a wire data cable, or a wireless transmission/reception device.

The second memory 251 stores a program for processing and controlling the base station control unit 252, reference data, various renewable data for storage, etc., and is provided as working memory of the base station control unit 252. Further, the second memory 251 stores a cell pattern and mapping information, a channel grouping table, a hopping pattern table, channel allocation condition information, and available wavelength channel information transmitted from the VLC terminal.

The base station control unit 252 processes data for the transmission/reception of data according to the VLC, and controls the second encoder 253, the second decoder 255, the selection control unit 262, and the generation operation of the base station. That is, the base station control unit 252 controls all of the operations necessary for the cell mapping and management and the channel allocation and management, and enables the selection control unit 262 to drive the second transmission driver 263 and the second reception driver 265 according to the channel allocation information corresponding to each VLC terminal or each light source.

Figure 7:
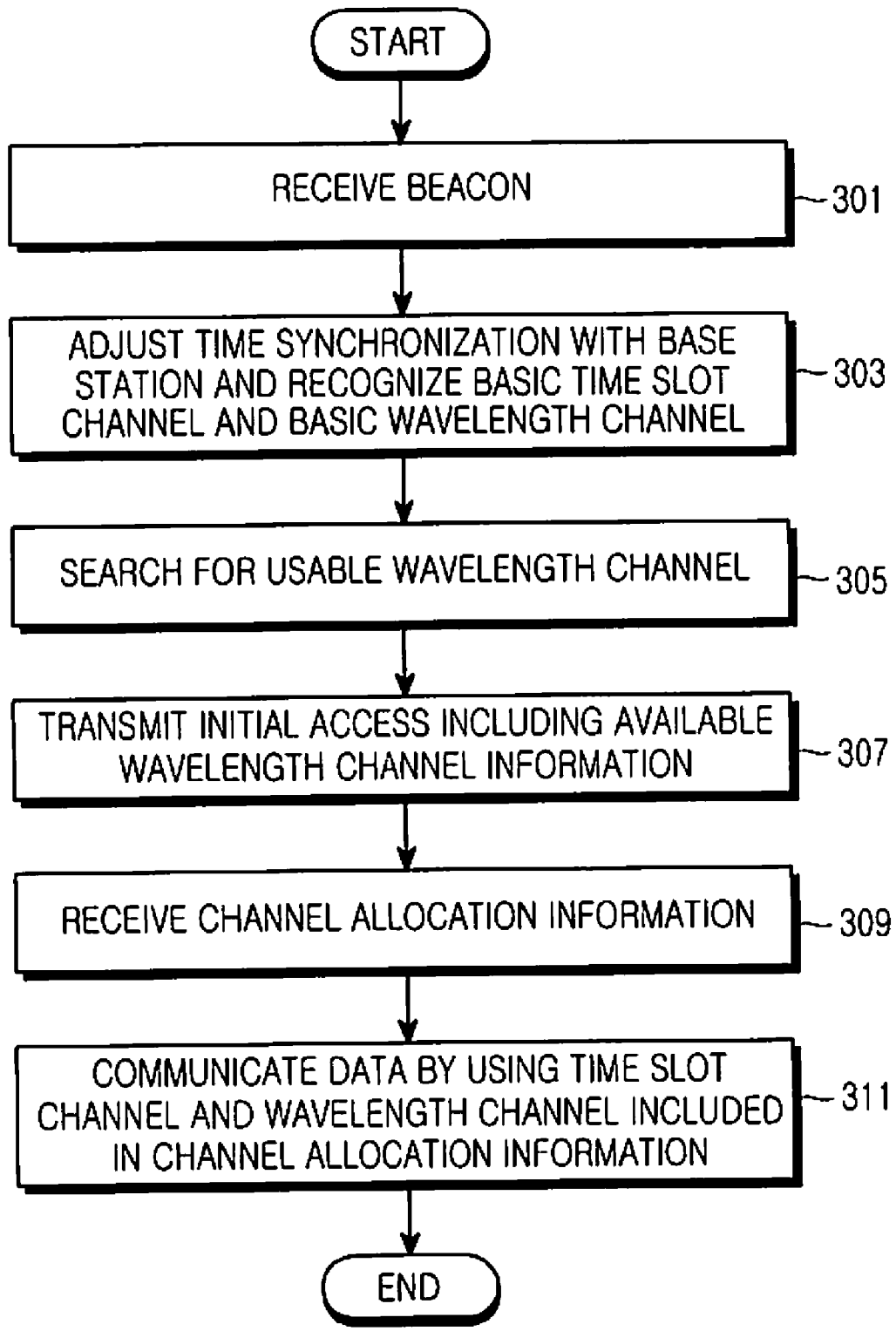
FIG. 7 is a flowchart illustrating an operation process of a VLC terminal according to an embodiment of the present invention.
Figure 8:
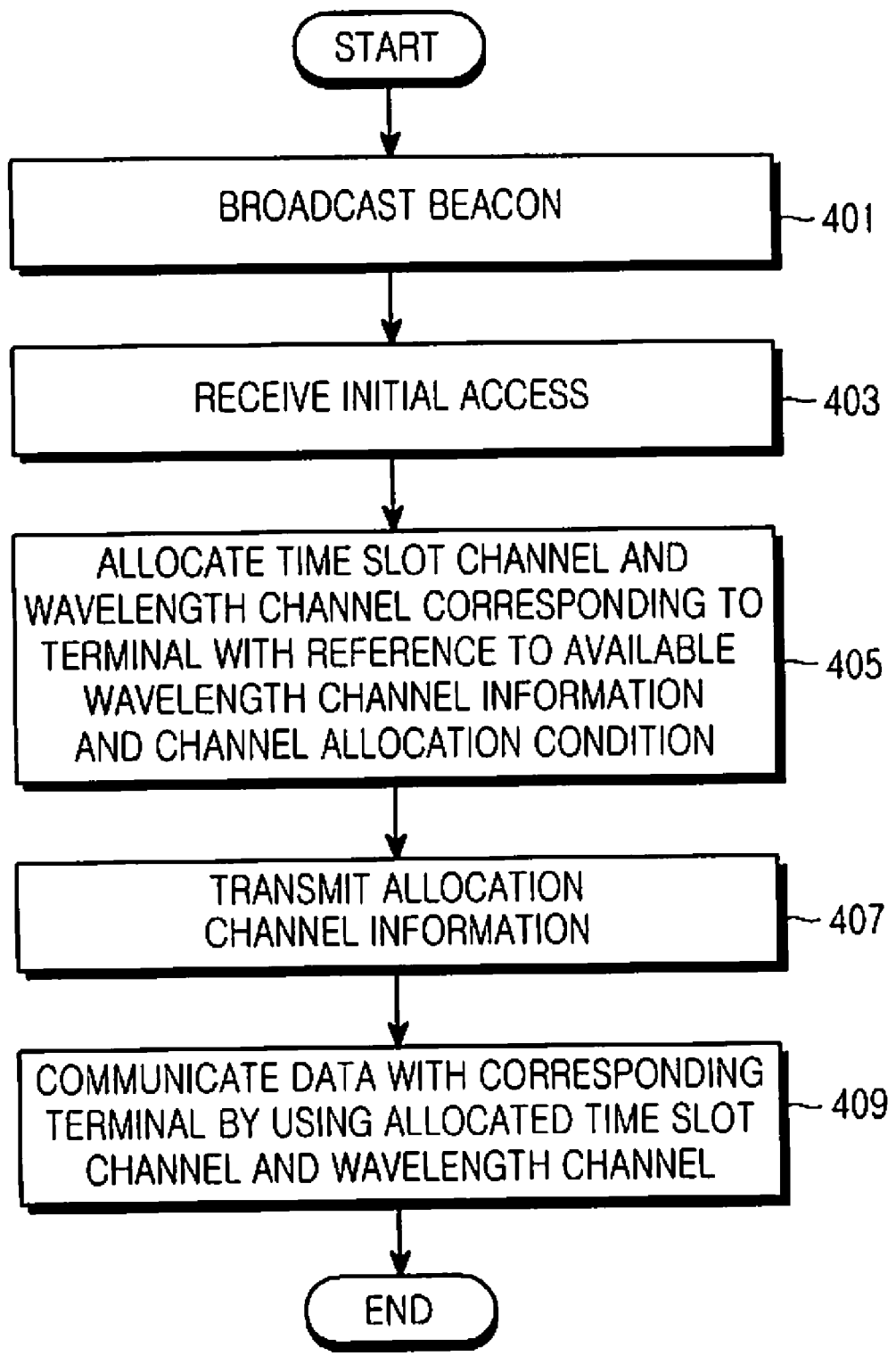
FIGS. 8 and 9 are flowcharts illustrating an operation process of a communication control device according to an embodiment of the present invention.
Figure 9:
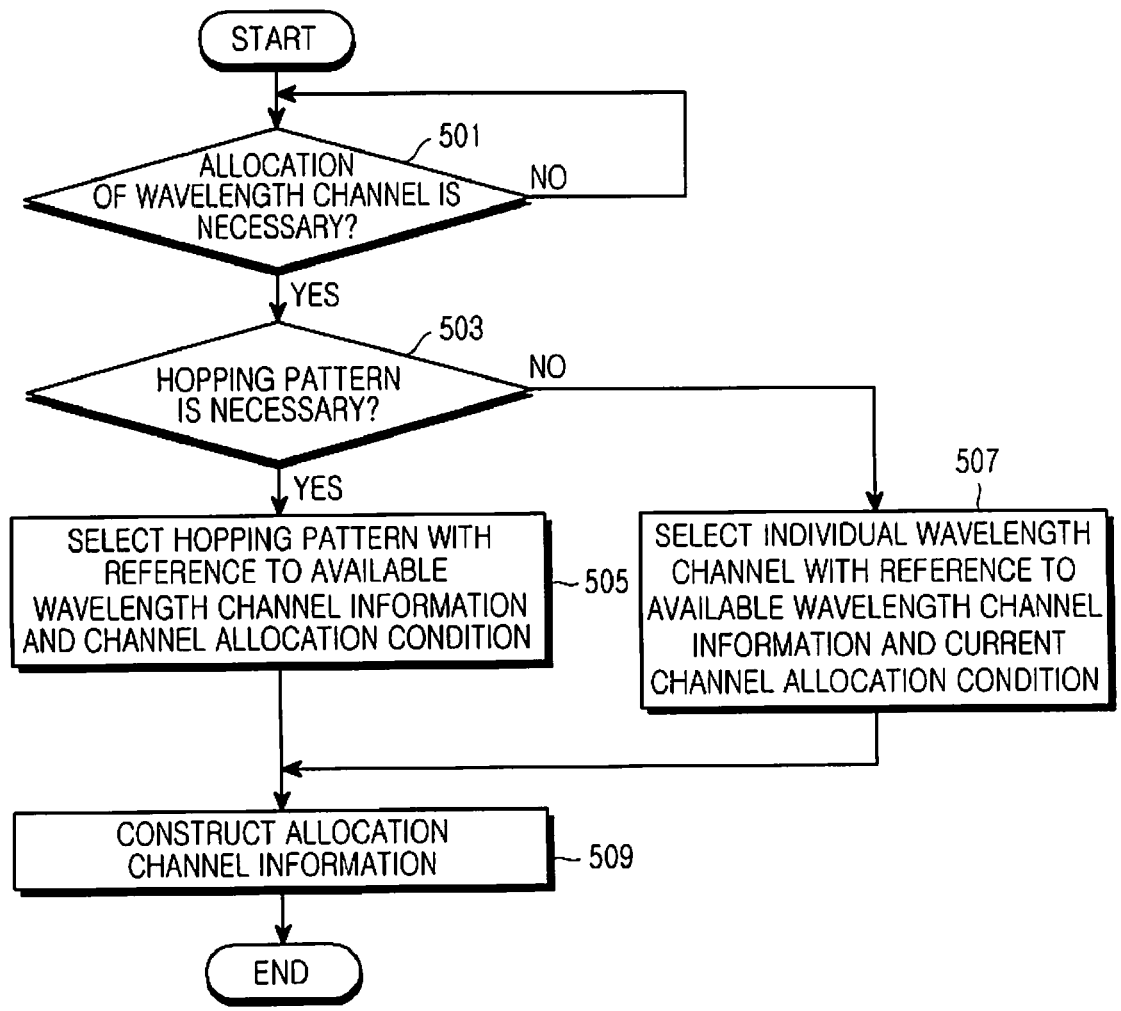

FIG. 7 is a flowchart illustrating an operation process of a VLC terminal according to an embodiment of the present invention, and FIGS. 8 and 9 are flowcharts illustrating an operation process of a communication control device according to an embodiment of the present invention.

Referring to FIG. 7, when a VLC terminal enters a service area of a predetermined light source, the VLC terminal receives a beacon broadcasted from the predetermined light source in step 301.

In step 303, the VLC terminal coordinates the time synchronization with the base station and recognizes a basic time slot channel and a basic wavelength channel. The basic time slot channel and the basic wavelength channel are pre-defined, so that the basic time slot channel and the basic wavelength channel may be transferred to the VLC terminal through a beacon message or the VLC terminal may recognize the basic time slot channel and the basic wavelength channel in advance.

In step 305, the VLC terminal searches for an available wavelength channel. The available wavelength channel can be determined according to a kind of wavelength channel supported by a light emitting device and a photosensitive device actually included in the VLC terminal and a current condition of peripheral light. The VLC terminal selects an appropriate channel ID corresponding to the available wavelength channel with reference to a grouping table and constructs available wavelength channel information.

In step 307, the VLC terminal transmits an initial access including the available wavelength channel information to the base station using the basic time slot channel and the basic wavelength channel.

In step 309, the VLC terminal 100 receives channel allocation information, and sets the LED and the PD according to a wavelength channel included in the channel allocation information.

In step 311, the VLC terminal communicates data using a time slot channel and the wavelength channel included in the channel allocation information. If the number of hopping patterns allocated to the VLC terminal is more than one, the VLC terminal can simultaneously use the wavelength channels having the same order in each hopping pattern.

Referring to FIG. 8, the base station periodically broadcasts the beacon in step 401. The base station receives the initial access including the available wavelength channel information from a VLC terminal in step 403. In step 405, the base station allocates a time slot channel and a wavelength channel available in a corresponding VLC terminal with reference to the available wavelength channel information and the current channel allocation condition.

If there is an effective time slot channel that is not currently allocated to any VLC terminal or light source, the base station does not allocate the wavelength channel, but allocates only the effective time slot channel to the VLC terminal. However, when all of the time slot channels are currently allocated, the base station allocates the wavelength channel that has not been currently used on the appropriate time slot channel, so that it allocates a communication channel to the VLC terminal.

In step 407, the base station transmits the channel allocation information including information of the time slot channel and the wavelength channel having been allocated to the VLC terminal. Thereafter, in step 409, the base station communicates data with the VLC terminal by driving a light source according to the channel allocation information corresponding to the VLC terminal.

The process of the base station allocating the wavelength channel according is illustrated in more detail in FIG. 9.

Referring to FIG. 9, the base station determines if it is necessary to allocate the wavelength channel for a predetermined VLC terminal in step 501. When it is determined necessary to allocate the wavelength channel to a predetermined VLC terminal, the base station determines if it is necessary to allocate a hopping pattern in step 503. The allocation of the hopping pattern may be determined according to the current communication environment and the allocation condition of the current wavelength channel. When it is determined necessary to allocate a hopping pattern, the base station selects an appropriate hopping pattern with reference to available wavelength channel information and the channel allocation condition of the current wavelength channel of the predetermined VLC terminal in step 505, and constructs channel allocation information in step 509. At this time, multiple hopping patterns may be selected, and the selected hopping patterns may be indicated as pattern IDs with reference to a hopping pattern table as shown in Table 2. Further, the channel allocation information may include data capable of identifying that the pattern ID of the hopping pattern has been included.

When it is determined unnecessary to allocate a hopping pattern in step 503, the base station selects an individual wavelength channel with reference to available wavelength channel information and a current wavelength channel allocation condition in step 507 and constructs channel allocation information. At this time, the selected wavelength channel may be indicated as a channel ID with reference to a channel grouping table as shown in Table 3.

Figure 11:
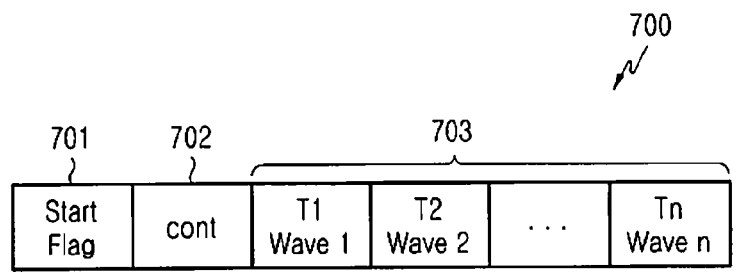
FIGS. 11 to 13 are diagrams illustrating a super frame according to an embodiment of the present invention.
Figure 12:
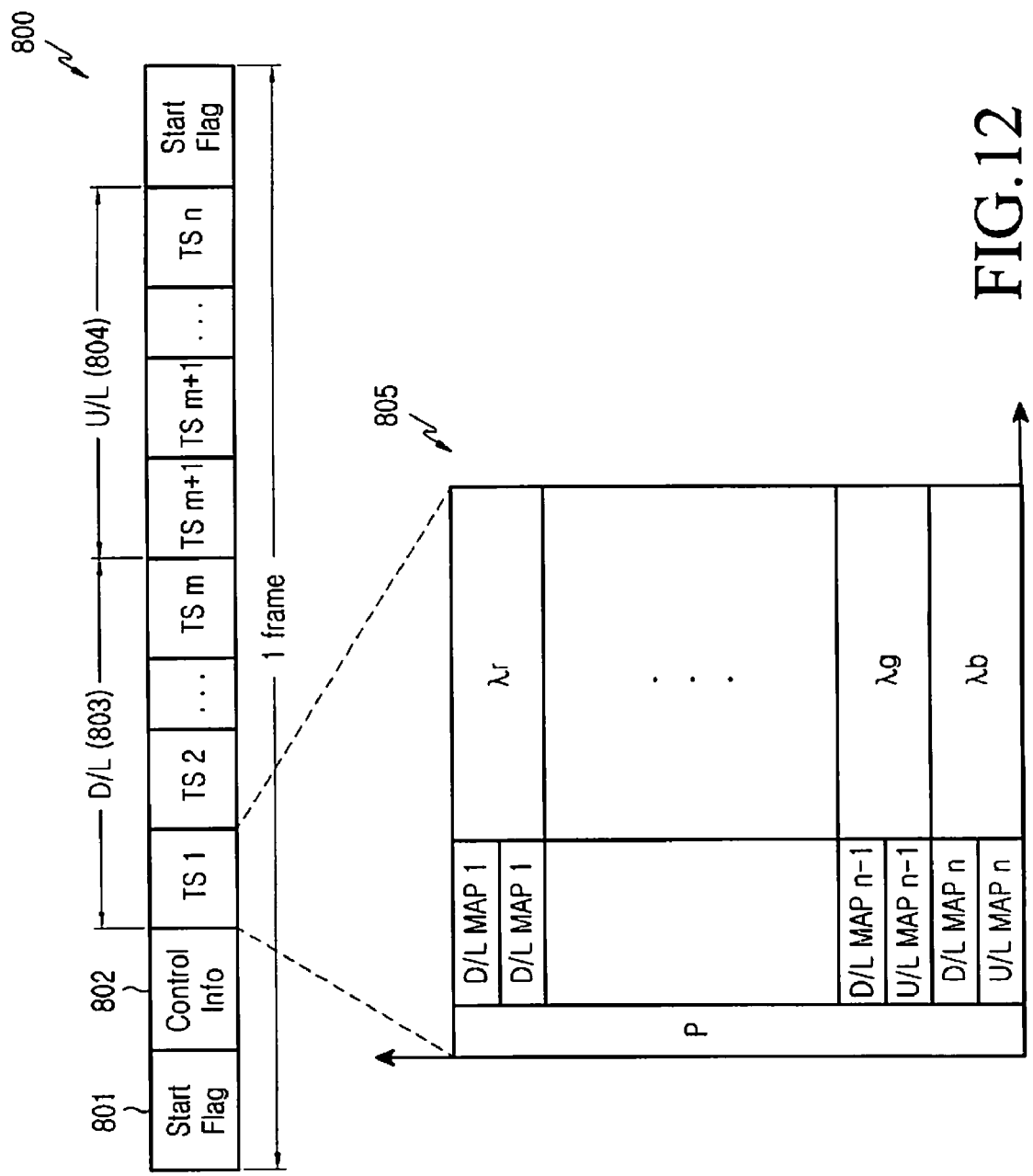
Figure 13:
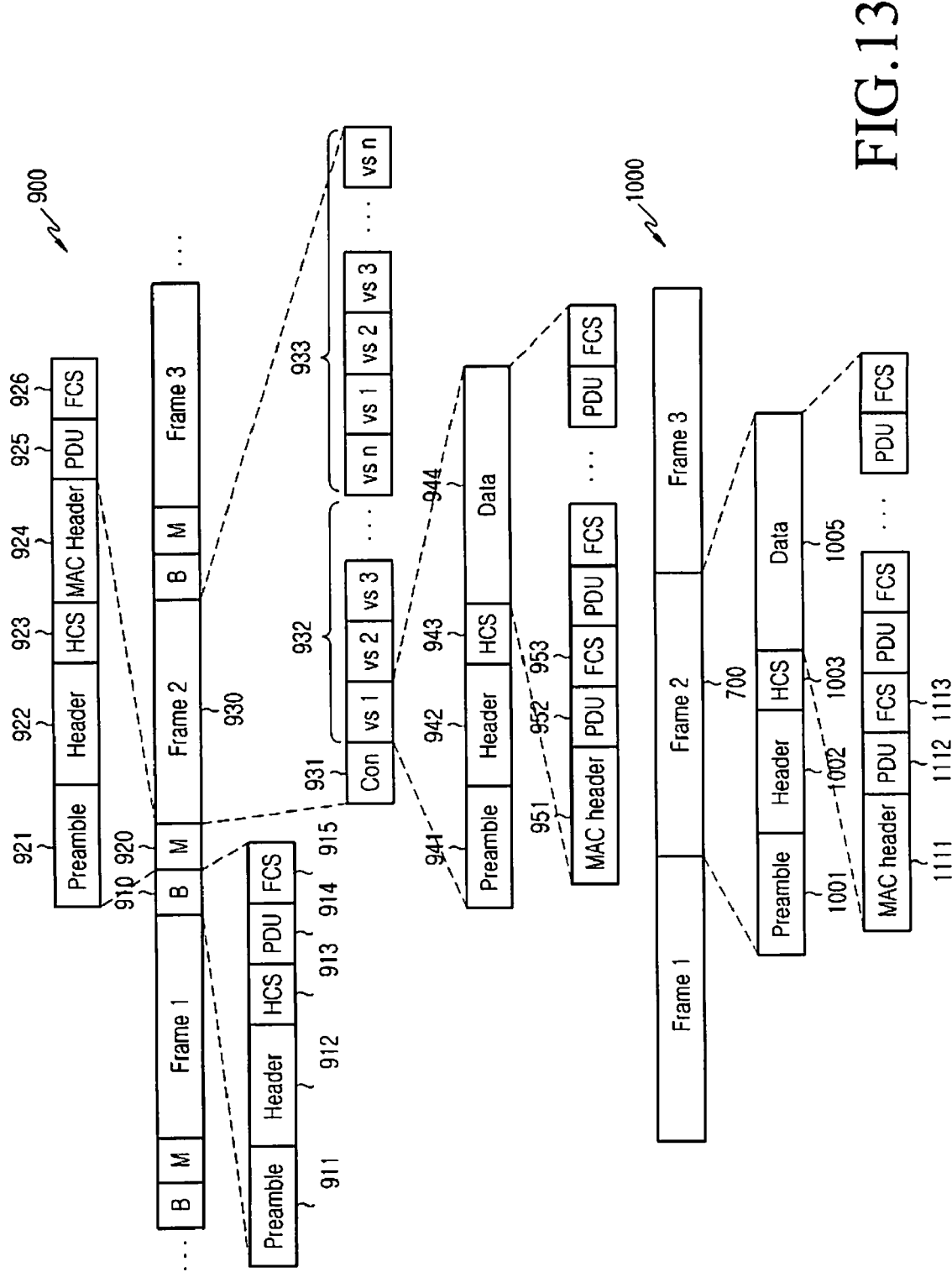

FIGS. 11 to 13 are diagrams illustrating super frames according to embodiments of the present invention.

More specifically, FIG. 11 illustrates where a single wavelength channel is allocated in a single time slot channel, and FIG. 12 illustrates where multiple wavelength channels are allocated in a single time slot channel.

Referring to FIG. 11, a first super frame 700 includes a start flag 701, control information 702, and a data section 703.

Referring to FIG. 12, a second super frame 800 includes a start flag 801, control information 802, a downlink section 803, and an uplink section 804.

In the super frames as FIGS. 11 to 12, available frequency channel information and channel allocation information can be transmitted/received in control information section 702 and 802. When the available frequency channel information is included in a physical header field, a message format may be constructed as shown in Table 4 below, and when the available frequency channel information is included in a MAC header field, a message format may be constructed as shown in Table 5 below.

The available frequency channel information is included in Src_multi_info of Tables 4 and 5.

TABLE 4

| syntax | size |
| --- | --- |
| Burst mode | 1 bit |
| Preamble | 4 bit |
| mode type | 2 bit |
| Src_multi_info | 8 bit |
| Length of MAC payload | 16 bit |
| Channel number | 3 bit |
| data rate | 4 bit |
| Reserved | 1 bit |

TABLE 5

| syntax | size |
| --- | --- |
| Version number | 2 bit |
| Fame type | 1 bit |
| mode type | 2 bit |
| Src_multi_info | 8 bit |
| Src address | 8 bit |
| Destination address | 8 bit |
| Num PDUs per frame | 8 bit |
| Sequence number | 12 bit |
| Secure | 1 bit |
| ack/nack | 2 bit |
| Frame sub type | 10 bit |
| Reserved | 1 bit |

Further, when the individual frequency channel is allocated, and the channel allocation information is included in the physical header field, a message format may be constructed as shown in Table 6 below, and when the channel allocation information is included in the MAC header field, a message format may be constructed as shown in Table 7 below.

The wavelength channel allocation information among the channel allocation information is included in Des_multi_info of Tables 6 and 7, and time slot channel allocation information is included in a time slot field.

TABLE 6

| syntax | size |
| --- | --- |
| Burst mode | 1 bit |
| Preamble | 4 bit |
| mode type | 2 bit |
| Des_multi_info | 8 bit |
| time slot | 8 bit |
| Length of MAC payload | 16 bit |
| Channel number | 3 bit |
| data rate | 4 bit |
| Reserved | 1 bit |

TABLE 7

| syntax | size |
| --- | --- |
| Version number | 2 bit |
| Fame type | 1 bit |
| mode type | 2 bit |
| DES_multi_info | 8 bit |
| time slot | 8 bit |
| Src address | 8 bit |
| Destination address | 8 bit |
| Num PDUs per frame | 8 bit |
| Sequence number | 12 bit |

TABLE 7-continued

| syntax | size |
| --- | --- |
| Secure | 1 bit |
| ack/nack | 2 bit |
| Frame sub type | 10 bit |
| Reserved | 1 bit |

In Tables 4 to 7, the message formats separately include the Src_multi_info field and the Des_multi_info field. However, the wavelength channel information and the channel allocation information can be included in the same message format, which is represented in Tables 8 and 9 below.

TABLE 8

| syntax | size |
| --- | --- |
| Burst mode | 1 bit |
| Preamble | 4 bit |
| mode type | 2 bit |
| Src_multi_info | 8 bit |
| Des_multi_info | 8 bit |
| time slot | 8 bit |
| Length of MAC payload | 16 bit |
| Channel number | 3 bit |
| data rate | 4 bit |
| Reserved | 1 bit |

TABLE 9

| syntax | size |
| --- | --- |
| Version number | 2 bit |
| Fame type | 1 bit |
| mode type | 2 bit |
| Src_multi_info | 8 bit |
| DES_multi_info | 8 bit |
| time slot | 8 bit |
| Src address | 8 bit |
| Destination address | 8 bit |
| Num PDUs per frame | 8 bit |
| Sequence number | 12 bit |
| Secure | 1 bit |
| ack/nack | 2 bit |
| Frame sub type | 10 bit |
| Reserved | 1 bit |

Further, when the hopping pattern is allocated, and the channel allocation information is included in the physical header field, a message format may be constructed as shown in Table 10 below, and when the channel allocation information is included in the MAC header field, a message format may be constructed as shown in Table 11 below.

In Tables 8 and 9, the wavelength channel allocation information among the channel allocation information is included in a H_pattern field, and time slot channel allocation information is included in a time slot field. In the event that the hopping pattern is not allocated, a value of the H_pattern field is represented in a predetermined value, e.g. "111".

TABLE 10

| syntax | size |
| --- | --- |
| Burst mode | 1 bit |
| Preamble | 4 bit |
| mode type | 2 bit |
| H_pattern | n bit |
| time slot | 8 bit |
| Length of MAC payload | 16 bit |

TABLE 10-continued

| syntax | size |
| --- | --- |
| Channel number | 3 bit |
| data rate | 4 bit |
| Reserved | 1 bit |

TABLE 11

| syntax | size |
| --- | --- |
| Version number | 2 bit |
| Fame type | 1 bit |
| mode type | 2 bit |
| H_pattern | n bit |
| time slot | 8 bit |
| Src address | 8 bit |
| Destination address | 8 bit |
| Num PDUs per frame | 8 bit |
| Sequence number | 12 bit |
| Secure | 1 bit |
| ack/nack | 2 bit |
| Frame sub type | 10 bit |
| Reserved | 1 bit |

FIG. 13 illustrates a super frame format according to another embodiment of the present invention.

Referring to FIG. 13, a third super frame 900 includes a beacon field 910, a management field 920 including control information for the VLC, and a data frame 930 including data.

The beacon field 910 includes a preamble 911, a header 912, a Header Check Sequence (HCS) 913, a Protocol Data Unit (PDU) 914, and a Frame Check Sequence (FCS) 915. The preamble 911 includes information for determining whether the VLC communication frame 900 communicates using multiple time slots. Therefore, a reception side receiving the VLC frame 900 examines the preamble 911 of the beacon field 910 in the reception of the frame 900, and when the time slot is not used, the reception side interprets the frame in the form of a fourth super frame 1000 of FIG. 13.

The management field 920 includes a preamble 921, a header 922, an HCS 923, a MAC header 924, a PDU 925, and an FCS 926. The MAC header 924 can be constructed as represented in Table 5.

The data frame 930 includes a single contention slot 930, a predetermined number of downlink time slots 932, and a predetermined number of uplink time slots 933. The time slots 932 and 933 are individually allocated to multiple users during the communication in the multicast or broadcast mode.

The single time slots 932 and 933 each include a preamble 941, a header 942, an HCS 943, and a data field 944. The data field 944 includes a single MAC header 951 and multiple pairs of PDUs 952 and FCSs 953. The MAC header 951 can be constructed as represented in Tables 7 and 9.

The fourth super frame 1000 is a VLC frame in a unicast communication mode according to an embodiment of the present invention, and includes a preamble 1001, a header 1002, an HCS 1003, and a data field 1005. The data field 1005 includes a MAC header 1111 and multiple pairs of PDUs 1112 and FCSs 1113.

Although specific embodiments have been described above, various changes and modifications can be made thereto within the technical spirit and scope of the present invention. For example, although the description above assumes that the hopping pattern is pre-defined, the hopping pattern may also be constructed in real time according to the VLC and then transmitted to a corresponding VLC terminal.

Further, the hopping pattern may be constructed in such a manner that the hopping pattern itself is transmitted to the VLC terminal without using the pattern ID. Further, the header message as shown in Tables 4 to 11 can be included in any control information section of the super frame.

Figure 14:
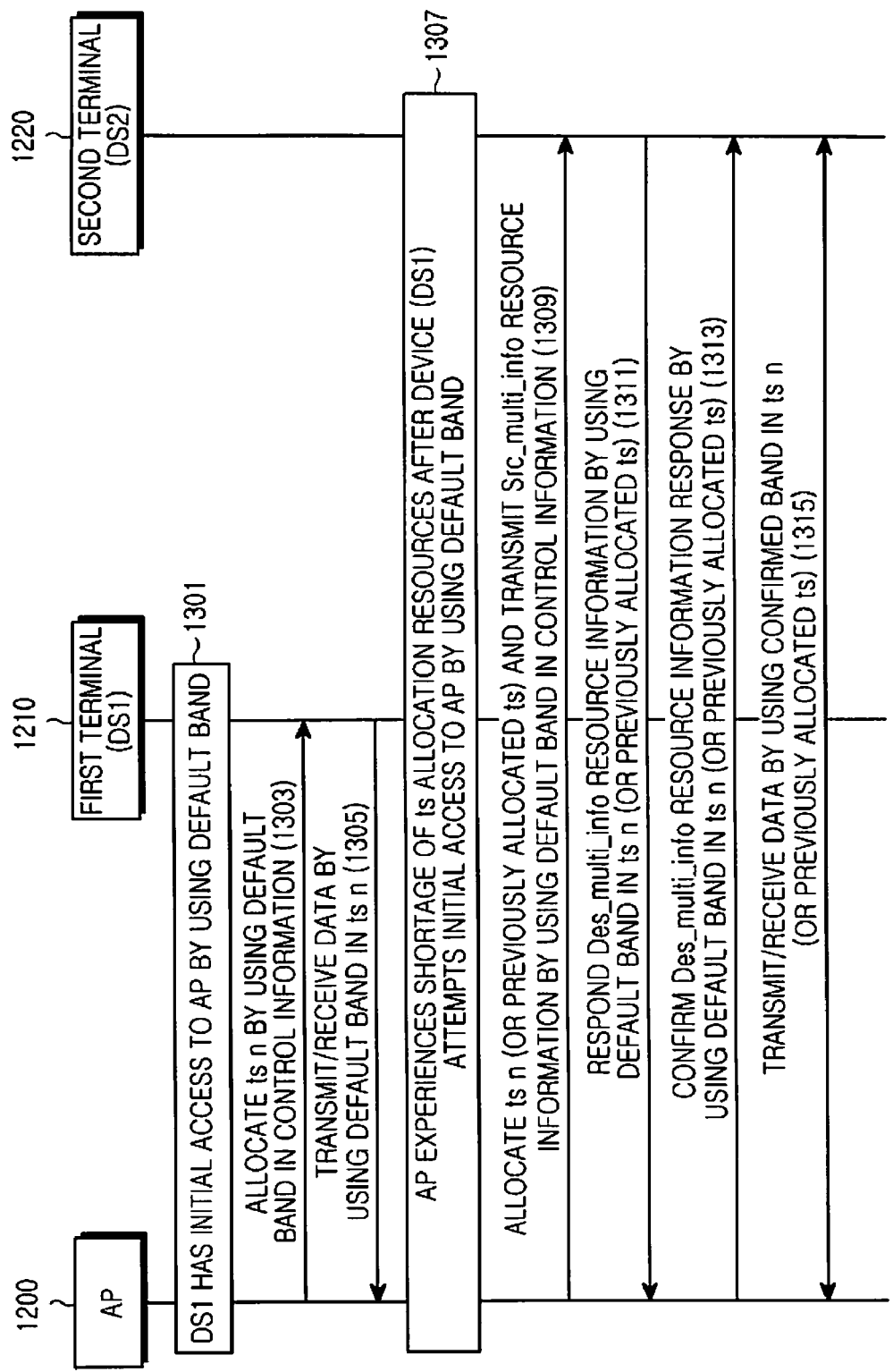
FIG. 14 is a diagram illustrating a band allocation process according to an embodiment of the present invention.

FIG. 14 is a diagram illustrating a band allocation process according to an embodiment of the present invention.

In FIG. 14, an Access Point (AP) 1200 corresponds to the aforementioned communication control device 200. Therefore, the AC 1200 can be similarly constructed with the communication control device 200. Similarly, a first VLC terminal 1210 and a second VLC terminal 1220 in FIG. 14 can be similarly constructed with the VLC terminal 100, as described above.

Further, in FIG. 14, a "band" refers to a band of the wavelength channel as described above, and therefore, has the same meaning as "wavelength channel". Additionally, a default band refers to a band corresponding to a wavelength channel used when the VLC terminal has initial access to the AP 1200. It is assumed that the AP 1200 can use wavelength channels in all of the bands. When the VLC terminal has initial access to the AP 1200, the AP 1200 detects a wavelength channel used by the VLC and determines a default band of the corresponding VLC based on the detected wavelength channel. Further, the AP transmits and receives data during the initial access using the determined default band.

During the initial access, when there is an effective time slot to be allocated to the VLC, i.e., a time slot that is not being used by another VLC terminal, the AP 1200 allocates the corresponding time slot to the VLC terminal. A wavelength channel used in the corresponding time slot by the relevant VLC terminal may be the default band. The time slots used in the VLC terminals currently accessing the AP 1200 are all different, so that it is not necessary to separately allocate the wavelength channel, so that the AP performs the actual data communication by using the default band used at the initial access. If it is necessary to allocate a specific time slot that has been used in another VLC terminal because there is no time slot to be newly allocated for the actual data communication, the AP allocates a specific time slot to the relevant VLC terminal, taking the wavelength channel that has been used in another VLC terminal into consideration.

In FIG. 14, it is possible to use a channel grouping table as shown in Table 12 below.

The channel grouping table shown in Table 12 uses 7 wavelength channels by way of example.

TABLE 12

| Bit | Band 1 | Band 2 | Band 3 | Band 4 | Band 5 | Band 6 | Band 7 |
|---|---|---|---|---|---|---|---|
| 0000000 | | | | | | | |
| 0000001 | X | X | X | X | X | X | ○ |
| 0000010 | X | X | X | X | X | ○ | X |
| 0000011 | X | X | X | X | X | ○ | ○ |
| 0000100 | X | X | X | X | ○ | X | X |
| 0000101 | X | X | X | X | ○ | X | ○ |
| 0000110 | X | X | X | X | ○ | ○ | X |
| 0000111 | X | X | X | X | ○ | ○ | ○ |
| 0001000 | X | X | X | ○ | X | X | X |
| 0001001 | X | X | X | ○ | X | X | ○ |
| 0001010 | X | X | X | ○ | X | ○ | X |
| 0001011 | X | X | X | ○ | X | ○ | ○ |
| 0001100 | X | X | X | ○ | ○ | X | X |
| 0001101 | X | X | X | ○ | ○ | X | ○ |
| 0001110 | X | X | X | ○ | ○ | ○ | X |
| 0001111 | X | X | X | ○ | ○ | ○ | ○ |
| 0010000 | X | X | ○ | X | X | X | X |
| 0010001 | X | X | ○ | X | X | X | ○ |

TABLE 12-continued

| Bit | Band 1 | Band 2 | Band 3 | Band 4 | Band 5 | Band 6 | Band 7 |
|---|---|---|---|---|---|---|---|
| 0010010 | X | X | ○ | X | X | ○ | X |
| 0010011 | X | X | ○ | X | X | ○ | ○ |
| 0010100 | X | X | ○ | X | ○ | X | X |
| 0010101 | X | X | ○ | X | ○ | X | ○ |
| 0010110 | X | X | ○ | X | ○ | ○ | X |
| 0010111 | X | X | ○ | X | ○ | ○ | ○ |
| 0011000 | X | X | ○ | ○ | X | X | X |
| 0011001 | X | X | ○ | ○ | X | X | ○ |
| 0011010 | X | X | ○ | ○ | X | ○ | X |
| 0011011 | X | X | ○ | ○ | X | ○ | ○ |
| 0011100 | X | X | ○ | ○ | ○ | X | X |
| 0011101 | X | X | ○ | ○ | ○ | X | ○ |
| 0011110 | X | X | ○ | ○ | ○ | ○ | X |
| 0011111 | X | X | ○ | ○ | ○ | ○ | ○ |
| 0100000 | X | ○ | X | X | X | X | X |
| 0100001 | X | ○ | X | X | X | X | ○ |
| 0100010 | X | ○ | X | X | X | ○ | X |
| 0100011 | X | ○ | X | X | X | ○ | ○ |
| 0100100 | X | ○ | X | X | ○ | X | X |
| 0100101 | X | ○ | X | X | ○ | X | ○ |
| 0100110 | X | ○ | X | X | ○ | ○ | X |
| 0100111 | X | ○ | X | X | ○ | ○ | ○ |
| 0101000 | X | ○ | X | ○ | X | X | X |
| 0101001 | X | ○ | X | ○ | X | X | ○ |
| 0101010 | X | ○ | X | ○ | X | ○ | X |
| 0101011 | X | ○ | X | ○ | X | ○ | ○ |
| 0101100 | X | ○ | X | ○ | ○ | X | X |
| 0101101 | X | ○ | X | ○ | ○ | X | ○ |
| 0101110 | X | ○ | X | ○ | ○ | ○ | X |
| 0101111 | X | ○ | X | ○ | ○ | ○ | ○ |
| 0110000 | X | ○ | ○ | X | X | X | X |
| 0110001 | X | ○ | ○ | X | X | X | ○ |
| 0110010 | X | ○ | ○ | X | X | ○ | X |
| 0110011 | X | ○ | ○ | X | X | ○ | ○ |
| 0110100 | X | ○ | ○ | X | ○ | X | X |
| 0110101 | X | ○ | ○ | X | ○ | X | ○ |
| 0110110 | X | ○ | ○ | X | ○ | ○ | X |
| 0110111 | X | ○ | ○ | X | ○ | ○ | ○ |
| 0111000 | X | ○ | ○ | ○ | X | X | X |
| 0111001 | X | ○ | ○ | ○ | X | X | ○ |
| 0111010 | X | ○ | ○ | ○ | X | ○ | X |
| 0111011 | X | ○ | ○ | ○ | X | ○ | ○ |
| 0111100 | X | ○ | ○ | ○ | ○ | X | X |
| 0111101 | X | ○ | ○ | ○ | ○ | X | ○ |
| 0111110 | X | ○ | ○ | ○ | ○ | ○ | X |
| 0111111 | X | ○ | ○ | ○ | ○ | ○ | ○ |
| 1000000 | ○ | X | X | X | X | X | X |
| 1000001 | ○ | X | X | X | X | X | ○ |
| 1000010 | ○ | X | X | X | X | ○ | X |
| 1000011 | ○ | X | X | X | X | ○ | ○ |
| 1000100 | ○ | X | X | X | ○ | X | X |
| 1000101 | ○ | X | X | X | ○ | X | ○ |
| 1000110 | ○ | X | X | X | ○ | ○ | X |
| 1000111 | ○ | X | X | X | ○ | ○ | ○ |
| 1001000 | ○ | X | X | ○ | X | X | X |
| 1001001 | ○ | X | X | ○ | X | X | ○ |
| 1001010 | ○ | X | X | ○ | X | ○ | X |
| 1001011 | ○ | X | X | ○ | X | ○ | ○ |
| 1001100 | ○ | X | X | ○ | ○ | X | X |
| 1001101 | ○ | X | X | ○ | ○ | X | ○ |
| 1001110 | ○ | X | X | ○ | ○ | ○ | X |
| 1001111 | ○ | X | X | ○ | ○ | ○ | ○ |
| 1010000 | ○ | X | ○ | X | X | X | X |
| 1010001 | ○ | X | ○ | X | X | X | ○ |
| 1010010 | ○ | X | ○ | X | X | ○ | X |
| 1010011 | ○ | X | ○ | X | X | ○ | ○ |
| 1010100 | ○ | X | ○ | X | ○ | X | X |
| 1010101 | ○ | X | ○ | X | ○ | X | ○ |
| 1010110 | ○ | X | ○ | X | ○ | ○ | X |
| 1010111 | ○ | X | ○ | X | ○ | ○ | ○ |
| 1011000 | ○ | X | ○ | ○ | X | X | X |
| 1011001 | ○ | X | ○ | ○ | X | X | ○ |
| 1011010 | ○ | X | ○ | ○ | X | ○ | X |
| 1011011 | ○ | X | ○ | ○ | X | ○ | ○ |
| 1011100 | ○ | X | ○ | ○ | ○ | X | X |
| 1011101 | ○ | X | ○ | ○ | ○ | X | ○ |
| 1011110 | ○ | X | ○ | ○ | ○ | ○ | X |

TABLE 12-continued

| Bit | Band 1 | Band 2 | Band 3 | Band 4 | Band 5 | Band 6 | Band 7 |
|---|---|---|---|---|---|---|---|
| 1011111 | ○ | X | ○ | ○ | ○ | ○ | ○ |
| 1100000 | ○ | ○ | X | X | X | X | X |
| 1100001 | ○ | ○ | X | X | X | X | ○ |
| 1100010 | ○ | ○ | X | X | X | ○ | X |
| 1100011 | ○ | ○ | X | X | X | ○ | ○ |
| 1100100 | ○ | ○ | X | X | ○ | X | X |
| 1100101 | ○ | ○ | X | X | ○ | X | ○ |
| 1100110 | ○ | ○ | X | X | ○ | ○ | X |
| 1100111 | ○ | ○ | X | X | ○ | ○ | ○ |
| 1101000 | ○ | ○ | X | ○ | X | X | X |
| 1101001 | ○ | ○ | X | ○ | X | X | ○ |
| 1101010 | ○ | ○ | X | ○ | X | ○ | X |
| 1101011 | ○ | ○ | X | ○ | X | ○ | ○ |
| 1101100 | ○ | ○ | X | ○ | ○ | X | X |
| 1101101 | ○ | ○ | X | ○ | ○ | X | ○ |
| 1101110 | ○ | ○ | X | ○ | ○ | ○ | X |
| 1101111 | ○ | ○ | X | ○ | ○ | ○ | ○ |
| 1110000 | ○ | ○ | ○ | X | X | X | X |
| 1110001 | ○ | ○ | ○ | X | X | X | ○ |
| 1110010 | ○ | ○ | ○ | X | X | ○ | X |
| 1110011 | ○ | ○ | ○ | X | X | ○ | ○ |
| 1110100 | ○ | ○ | ○ | X | ○ | X | X |
| 1110101 | ○ | ○ | ○ | X | ○ | X | ○ |
| 1110110 | ○ | ○ | ○ | X | ○ | ○ | X |
| 1110111 | ○ | ○ | ○ | X | ○ | ○ | ○ |
| 1111000 | ○ | ○ | ○ | ○ | X | X | X |
| 1111001 | ○ | ○ | ○ | ○ | X | X | ○ |
| 1111010 | ○ | ○ | ○ | ○ | X | ○ | X |
| 1111011 | ○ | ○ | ○ | ○ | X | ○ | ○ |
| 1111100 | ○ | ○ | ○ | ○ | ○ | X | X |
| 1111101 | ○ | ○ | ○ | ○ | ○ | X | ○ |
| 1111110 | ○ | ○ | ○ | ○ | ○ | ○ | X |
| 1111111 | ○ | ○ | ○ | ○ | ○ | ○ | ○ |

FIG. 14 illustrates a case in which, during the use of the default band of the first VLC terminal 1210 in the actual data communication by the AP 1200 and the first VLC terminal 1210, the second VLC terminal 1220 makes a request of an initial access to the AP 1200.

In the event that there is no effective time slot, so that there is no time slot that can be allocated for the data transmission with the second VLC terminal 1220 and that has not been occupied by a different terminal, the AP 1200 allocates the time slot being used in an existing different terminal to the second VLC terminal 1220 and allocates a wavelength channel that has not been used in the existing different terminal on the same time slot in accordance with the allocated time slot. The allocated wavelength channel is the wavelength channel supported by the second VLC terminal 1220.

In FIG. 14, the AP 1200 allocates a time slot ts-n used in the first VLC terminal 1210 to the second VLC terminal 1220 and allocates a wavelength channel that does not overlap with the default band of the first VLC terminal 1210 as a data transmission/reception band of the second VLC terminal 1220 because that the first VLC terminal 1210 transmits/receives the actual data using the wavelength channel corresponding to the default band. Therefore, the time slots having been allocated to the first VLC terminal 1210 and the second VLC terminal 1220 are identical, but the bands of the wavelength channels allocated to each terminal are different, so that it is possible to allocate the wavelength channel without interference. Herein, it is assumed that there is a single default band.

Referring to FIG. 14, in step 1301, the first VLC terminal 1210 performs initial access to the AP 1200 through a light source close to its current location using a basic time slot used in a contention section of the frame. The AP 1200 detects the wavelength channel used in the initial access to the first VLC terminal DS1 1210 and determines the detected wavelength channel as the default band. Assuming that the wavelength channel supportable by the first VLC terminal 1210 is a first band, the default band of the first VLC terminal 1210 is the first band. The AP 1200 allocates a time slot ts-n, which is not currently occupied by a different VLC terminal, to the first VLC terminal 1210.

In step 1303, the AP notifies the first VLC terminal 1210 of the allocation of the time slot ts-n using the default band of the first VLC terminal 1210. The time slot ts-n has not been occupied in the different VLC terminal, enabling the first VLC terminal 1210 and the AP 1200 to actually communicate data with each other in the time slot ts-n using the default band of the first VLC terminal 1210 in step 1305.

In step 1307, the second VLC terminal 1220 attempts initial access to the AP 1200 through the basic time slot, which is used in the contention section. The AP 1200 identifies if there is an effective time slot capable of being allocated to the second VLC terminal 1220. When there is no time slot capable of being newly allocated because the VLC terminal currently accessing the AP 1200 occupies all of the time slots, the AP 1200 allocates the time slot that is being used to the second VLC terminal 1220. That is, the AP 1200 detects the wavelength channel that has been used in the initial access of the second VLC terminal 1220 in step 1307. The wavelength channel used by the second VLC terminal 1220 is assumed as a second band. In this respect, the default band of the second VLC terminal 1220 is a second band.

When there is no effective time slot that has not been currently allocated to a different VLC terminal, the AP 1200 determines to allocate the time slot ts-n being allocated to the first VLC terminal 1210 to the second VLC terminal 1220.

In step 1309, the AP 1200 allocates the time slot ts-n to the second VLC terminal 1220 using the default band of the second VLC terminal 1220. The AP 1200 transfers information of the allocatable wavelength channel in the time slot ts-n to the second VLC terminal 1220 using the default band.

In step 1309, the second VLC terminal 1220 receives the time slot allocated to the second VLC terminal 1220 and information of the available wavelength channel detects a supportable wavelength channel among the received available wavelength channel information. For example, when second to fifth bands are included in the available wavelength channel information and the wavelength channels supportable by the second VLC terminal 1220 are the second to fourth bands, the second VLC terminal 1220 selects the second to fourth bands.

In step 1311, the second VLC terminal 1220 transfers information of the wavelength channel that is supportable by the second VLC terminal 1220 among the available wavelength channels through its default band in the time slot ts-n. That is, the second VLC terminal 1220 transmits information of the second to fourth bands.

In step 1313, the AP 1200 transfers use confirmation of the supportable wavelength channel using the default band of the second VLC terminal 1220.

In step 1315, the AP 1200 and the second VLC terminal DS2 1220 communicate data through the confirmed band in the time slot ts-n, i.e., the second to fourth bands.

Table 13 represents an example of the management field 920 including the channel allocation information transmitted and received in steps 1309 to 1313.

In Table 13, the AP 1200 uses bits allocated to Src_multi_info. When the AP 1200 uses 0000100 (Band 5) of Table 12 for Src_multi_info of Table 13, the AP 1200 transmits information, which reports that it is possible to use Band 5 by using the default band, to the second VLC terminal DS2 1220 through common control information. Then, with respect to the Src_multi_info transmitted to the second VLC terminal 1220 by the AP 1200, the second VLC terminal 1220 sends a response using a communicatable band, i.e., the default band. That is, when the second VLC terminal 1220 has transmitted Des_multi_info of Table 13 with bits of 0000100 as a response, the AP 1200 determines that the second VLC terminal 1220 can communicate using Band 5. As a result, the band through which the AP 1200 and the second VLC terminal DS2 1220 can communicate, is Band 5 of the time slot is-n.

The multiple bands hopping method decreases interference between adjacent cells when the VLC system communicates with the AP 1200 and the terminal by using the TDM scheme and the multiple bands, and uniformly allocates the multiple bands between adjacent cells or adjacent light resources in the use of the multiple bands. Here, the use of the multiple bands means the use of multiple wavelength channels.

Assuming that a terminal, which newly enters a cell during a communication between the AP 1200 and the VLC terminals included within the cell in the VLC system, expands

TABLE 13

| Management payload filed | Bit | Usage/Description | Down/Up Link |
|---|---|---|---|
| Src_multi_info | 7 | Available Channels information Coordinator (Access Point) ex: 0000000: No multiple Channel mode ex: 0000001: using channel "A" ex: 0000101: using channel "A" and "C" | D/L |
| Des_multi_info | 7 | Available channels information mobile device ex: 0000000: No multiple channel mode ex: 0000001: using channel "A" ex: 0000101: using channel "A" and "C" | U/L |
| H_pattern | 5 | Channels hopping information | D/L |
| VF_info_type | 1 | using Visible Frame transmission ex 1: Receiver transmit the Visible Frame ex 0: Receiver Does Not transmit the Visible Frame | D/L |
| G_cell_ID | 10 | Granular cell size | D/L |
| Fractional_Src | 2 | Using fractional resource assignment ex 1: yes (fractional resource assignment) ex 0: no (general resource assignment) | D/L |
| Mode type | 2 | Mode type ex 1: multicast | D/L |
| S_Release_slot | 5 | the start slot and release slot information for broadcast mode | D/L |
| Spatial mobility | 2 | Using Spatial mobility | D/L |
| DS_ID | 10 | Device ID | D/L, U/L |
| Number of Time slot | 5 | Assigned time slot number | D/L |
| Cell_info | 10 | Cell ID, Optical Source ID, AP ID (D/L) PD_ID (U/L) ex: Cell n_ID_n | D/L, U/L |
| B_info | 2 | Cell boundary information | D/L |
| S_info | 5 | Time slot assignment and response (D/L) Request (U/L) | D/L, U/L |

According to another embodiment of the present invention, a multiple hopping scheme can be applied. The multiple hopping scheme can be applied when light sources connected to the AP in the communication system form several cells so that interference is generated between adjacent cells or adjacent light sources.

Further, the hopping scheme is used when light sources connected to the AP use multiple bands. That is, the hopping scheme may not be applied to the communication environment in which it is difficult to implement a single band or multiple bands. Especially, when a single light source or several light sources transmitted from the AP 1200 are grouped and transmit the same data to the same time slot or in the case of the P2P communication, there is no interference between adjacent cells, so that the hopping scheme is not applied.

If such a hopping scheme is applied within a single cell, the wavelength channel, i.e., the multiple bands, can be allocated when the AP 1200 has difficulty allocating the time slot to the VLC terminal having new initial access to the cell for the communication, interference between adjacent light sources, or adjacent cells connected to the AP 1200 in the multiple bands environment decreases, and it is possible to uniformly allocate resources to the adjacent light sources or adjacent cells in the allocation of the multiple bands.

resources by using multiple bands when time slots are insufficient for the terminal's attempt to make an initial access to the AP 1200 for communication with the AP 1200, the same time slot as that of an existing terminal is allocated to a new terminal by the AP 1200. However, because the time slot allocated to the new terminal has a band that is different from that of the existing terminal, the new terminal can communicate without interference in spite of the same time slot being used as that of the existing terminal.

Figure 15:
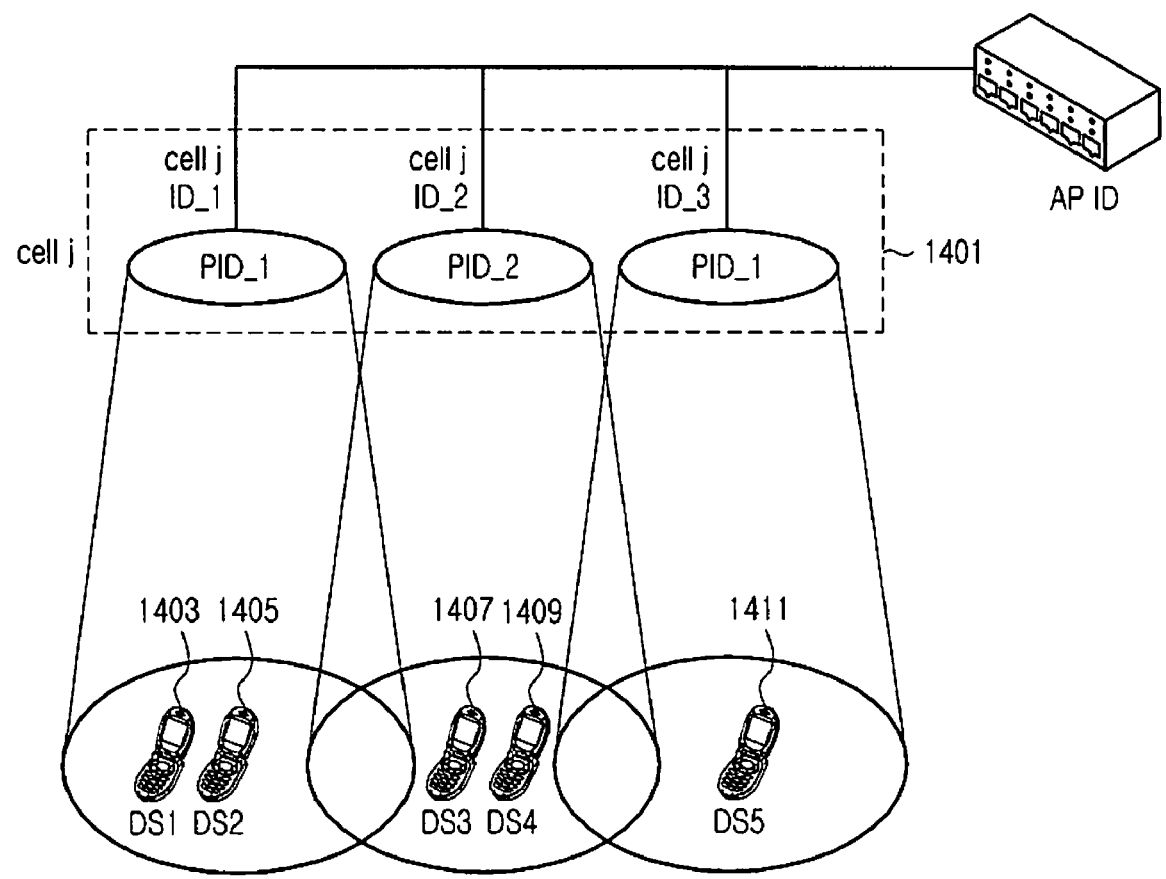
FIGS. 15 and 16 illustrate a view and a signal flow diagram, respectively, of a hopping pattern allocation process according to an embodiment of the present invention.
Figure 16:
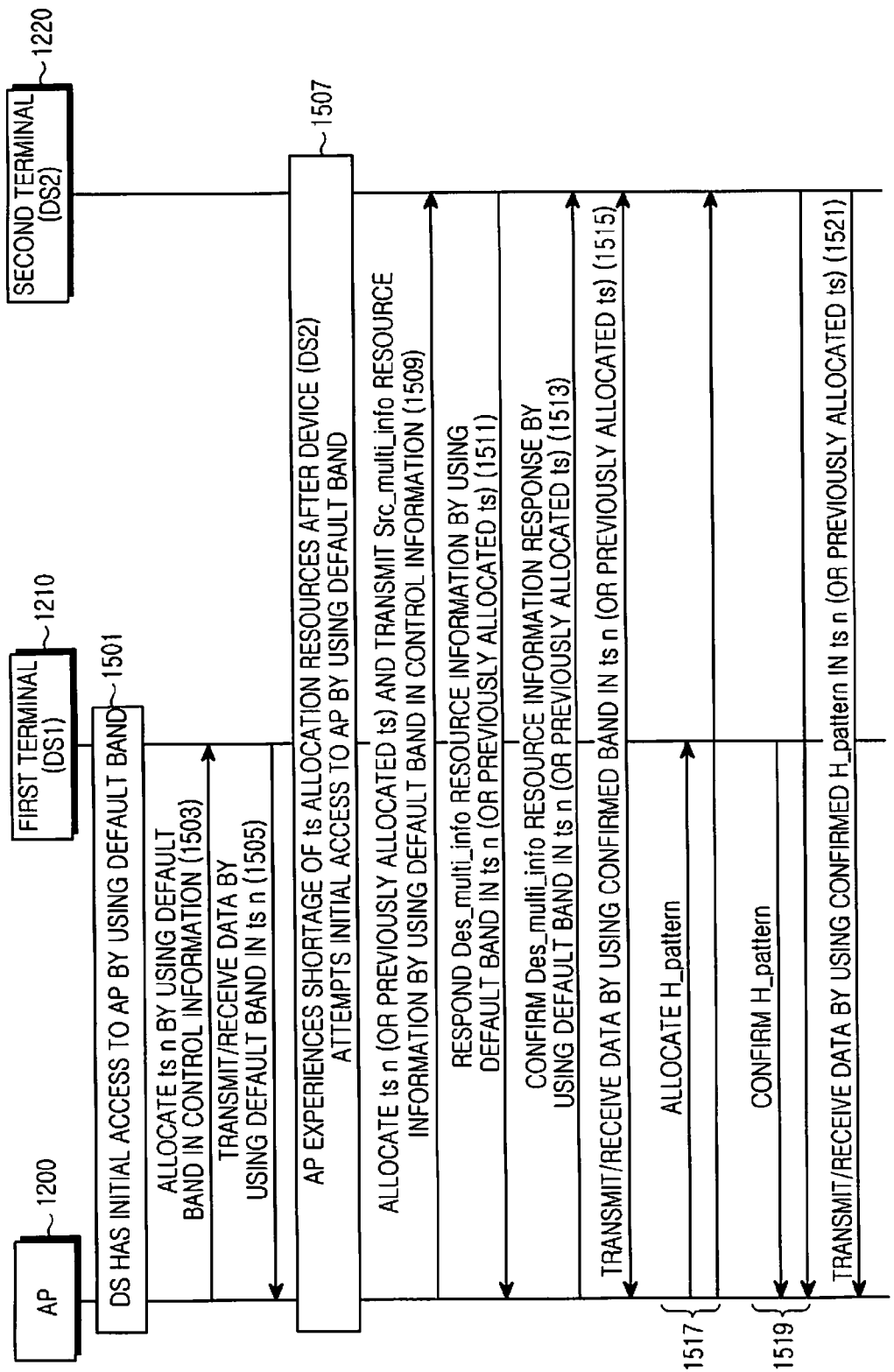

FIGS. 15 and 16 illustrate a view and a signal flow diagram, respectively, of a hopping pattern allocation process according to an embodiment of the present invention.

As illustrated in FIG. 15, if a light source cell j ID_1, cell j ID_2, and cell j ID_3, and PID_1, PID_2, and PID_3 within a cell j 1401 are grouped in the same cell, a terminal 1403, a terminal 1405, a terminal 1407, a terminal 1409, and a terminal 1411 included in the cell j ID_1, cell j ID_2, and cell j ID_3 use the same time slot. However, the terminals should use different bands in order to communicate with the AP 1200 without interference. Further, in FIG. 15, when the terminals can use various bands, the hopping scheme is applied such that the multiple band resources allocated to the terminal 1411 and multiple band resources allocated to terminal 1403, terminal 1405, terminal 1407, and terminal 1409 are uniform.

In FIG. 15, if the terminal 1403, the terminal 1405, the terminal 1407, and the terminal 1409 included in the cell j 1401 uses the time slot same as the cell j 1401 when they communicate using the multiple bands in the cell j 1401, the terminals included in the cell j 1401 receives the allocation of the same time slot, but receive the allocation of different bands, so that they can communicate without interference. However, when the terminal 1403 receives the allocation of Band 1, terminal 1405 receives the allocation of Band 2, terminal 1407 receives the allocation of Band 3 and Band 4, terminal 1409 receives the allocation of Band 5 and Band 6, and terminal 1411 receives the allocation of Band 7, the resources are not uniformly allocated to all the terminals included in the cell j 1401. That is, in FIG. 15, the single band is allocated to each of terminal 1403 and terminal 1405, two bands are allocated to terminal 1407 and terminal 1409, respectively, and a single band is allocated to the terminal 1411, so that terminal 1407 and terminal 1409 have a better environment for resource allocation than that of terminal 1403, terminal 1405, and terminal 1411. Therefore, the hopping pattern is constructed so as to solve the non-uniformity of the resource allocation and improve the uniformity of the resource allocation.

Table 14 represents an example of the hopping method.

TABLE 14

|  | Cell j ID_1(00001) | Cell j ID_2(00010) | Cell j ID_3(00100) |
| --- | --- | --- | --- |
| Frame #1 | Band 1 Band2 | band 3, band 4 band 5, band 6 | Band 7 |
| Frame #2 | band 3, band 4 band 5, band 6 | Band 7 | Band 1 Band2 |
| Frame #3 | Band 7 | Band 1 Band2 | band 3, band 4 band 5, band 6 |
| 00000: No use of hopping pattern | | | |

In constructing the multiple bands by the VLC terminals included in the cell, this hopping method can be applied after the multiple band allocation process for resource information between the AP 1200 and the VLC terminals in FIG. 14. When the bit values of Table 12 are applied to the H_pattern of Table 13, it is possible to uniformly allocate all of the resources by performing the hopping in various ways, such as hopping frame by frame, hopping time slot by time slot, or hopping based on a group of several frames.

Further, the hopping method is applied to the light sources within the cell, as well as the inside of the cell, so that uniform resource allocation is possible. If the bits value of H_pattern is 00000, it is possible to communicate using the existing single or multiple bands, which are not used in the hopping pattern.

FIG. 16 illustrates a process of transmitting information of the hopping pattern to the terminal and the hopping of the wavelength channel using the hopping pattern information by the terminal.

In FIG. 16, steps 1501 to 1515 are identical to steps 1301 to 1315 of FIG. 14, and steps 1517, 1519, and 1521 are added. Accordingly, a repetitive description of steps 1501 to 1515 will be omitted.

The hopping pattern may be allocated to all terminals within the cell in steps 1517 and 1519, or allocated to specific terminals within the cell according to another example.

FIG. 16 illustrates the method of allocating the hopping pattern to all terminals of the cell. In step 1517, when the AP 1200 has allocated each of different hopping patterns H_patterns to the terminal 1210 and the terminal 1220, i.e., H-Pattern 00001 to the terminal 1210 and H_pattern 00010 to the terminal 1220, using the terminal ID, the terminals 1210 and 1220 process the hopping according to a predetermined frame or time slot. In step 519, the terminal 1210 and 1220 confirm the allocation, and in step 1521, when the terminals communicate using the determined frame or time slot, the terminals can process the hopping in an interval of a single or more frames or time slots.

Accordingly, when a VLC service is provided using adjacent multiple light sources, the various embodiments of the present invention can provide each user with various services, can provide the VLC in an area in which the service areas of the multiple light sources providing different services are overlapped, and can efficiently use the light sources of the VLC system.

While the present invention has been shown and described with reference to certain embodiments and drawings thereof, it will be understood by those skilled in the art that various changes in form and details may be made therein without departing from the spirit and scope of the present invention as defined by the appended claims.

What is claimed is:

1. A method for allocating a channel of a Visible Light Communication (VLC) terminal in a VLC system, the method comprising the steps of:
   receiving a beacon message;
   coordinating time synchronization with a base station;
   searching for a currently available wavelength channel;
   constructing available wavelength channel information;
   transmitting an initial access request including the available wavelength channel information to the base station using a basic time slot channel and a basic wavelength channel;
   receiving channel allocation information from the base station; and
   communicating data with the base station using an allocated time slot channel included in the channel allocation information and an allocated wavelength channel included in the channel allocation information.

2. The method of claim 1, wherein the currently available wavelength channel includes a wavelength channel that does not currently generate interference by peripheral light, among wavelength channels supported by a light emitting device and a photosensitive device included in the VLC terminal.

3. The method of claim 1, wherein the allocated wavelength channel is determined by a hopping pattern included in the channel allocation information, and
   wherein the hopping pattern is constructed such that a wavelength channel, which a single VLC terminal has to use in the allocated time slot channel, is differently defined time slot by time slot or frame by frame.

4. The method of claim 3, when the hopping pattern is included in the channel allocation information, further comprising:
   detecting, in the communicated data, an allocated wavelength channel to be used from the hopping pattern; and
   driving a light emitting device and a photosensitive device included in the VLC terminal according to a wavelength band corresponding to the allocated time slot channel and the detected allocated wavelength channel.

5. An apparatus for allocating a channel of a Visible Light Communication (VLC) terminal, comprising:
   a light emitting device;
   a photosensitive device; and
   a control unit for receiving a beacon message received through the photosensitive device and coordinating time synchronization with a base station, searching for a currently available wavelength channel and constructing available wavelength channel information, transmitting an initial access request including the available wavelength channel information to the base station through the light emitting device using a basic time slot channel and a basic wavelength channel, receiving channel allocation information from the base station through the photosensitive device, and communicating data with the base station using an allocated time slot channel included in the channel allocation information and an allocated wavelength channel included in the channel allocation information.

6. The apparatus of claim 5, wherein the currently available wavelength channel includes a wavelength channel that does not generate interference by peripheral light, among wavelength channels supported by the light emitting device and the photosensitive device.

7. The apparatus of claim 5, wherein the allocated wavelength channel is determined by a hopping pattern included in the channel allocation information, and the hopping pattern is a varying pattern of a wavelength channel constructed such that a wavelength channel, which a single VLC terminal is to use in the allocated time slot channel, is differently defined time slot by time slot or frame by frame.

8. The apparatus of claim 5, wherein when the hopping pattern is included in the allocation channel information, the control unit detects, in the communicated data, an allocated wavelength channel that is to be used from the hopping pattern and drives the light emitting device and the photosensitive device according to a wavelength band corresponding to the allocated time slot channel and the detected allocated wavelength channel.

9. A method for allocating a channel of a base station including a light source in a Visible Light Communication (VLC) system, the method comprising the steps of:
broadcasting a beacon message including a frame synchronization signal;
receiving an initial access including available wavelength channel information from a VLC terminal;
allocating a time slot channel and a wavelength channel corresponding to the VLC terminal, according to the available wavelength channel information and a current channel allocation condition;
transmitting channel allocation information including information of the allocated time slot channel and the allocated wavelength channel to the VLC terminal; and
communicating data with the VLC terminal using the allocated time slot channel included in the channel allocation information and the allocated wavelength channel included in the channel allocation information.

10. The method of claim 9, wherein the available wavelength channel information includes information of a wavelength channel, which does not generate interference by peripheral light, among wavelength channels supported by a light emitting device and a photosensitive device included in the VLC terminal.

11. The method of claim 9, wherein the allocated wavelength channel is selected from wavelength channels included in the available wavelength channel information, except for wavelength channels allocated to a light source adjacent to a light source providing a service for a current location of the VLC terminal.

12. The method of claim 9, wherein the allocated wavelength channel is determined by a hopping pattern among multiple hopping patterns, and the hopping pattern is constructed such that a wavelength channel, which the single VLC terminal is to use in the allocated time slot channel, is differently defined time slot by time slot or frame by frame.

13. The method of claim 9, wherein in allocating the time slot channel and the wavelength channel corresponding to the VLC terminal according to the available wavelength channel information and the current channel allocation condition, when a currently allocatable time slot exists, a wavelength channel is not allocated.

14. An apparatus for allocating a channel of a base station in a Visible Light Communication (VLC) system, comprising:
a light source; and
a base station control unit for broadcasting a beacon message including a frame synchronization signal through the light source, receiving an initial access including available wavelength channel information from a VLC terminal through the light source, allocating a time slot channel and a wavelength channel corresponding to the VLC terminal, according to the available wavelength channel information and a current channel allocation condition, transmitting channel allocation information including information of the allocated time slot channel and the allocated wavelength channel to the VLC terminal through the light source, and communicating data with the VLC terminal using the allocated time slot channel included in the channel allocation information and the allocated wavelength channel included in the channel allocation information.

15. The apparatus of claim 14, wherein the available wavelength channel information includes information of a wavelength channel, which does not generate interference by peripheral light, among wavelength channels supported by a light emitting device and a photosensitive device included in the VLC terminal.

16. The apparatus as claimed in claim 14, wherein the base station control unit selects the allocated wavelength channel from wavelength channels included in the available wavelength channel information, except for wavelength channels allocated to a light source adjacent to a light source providing a service for a current location of the VLC terminal.

17. The apparatus as claimed in claim 14, wherein the allocated wavelength channel is determined by a hopping pattern among multiple hopping patterns, and the hopping pattern is constructed such that a wavelength channel, which a single VLC terminal is to use in the allocated time slot channel, is differently defined time slot by time slot or frame by frame.

18. The apparatus as claimed in claim 14, wherein in allocating the time slot channel and the wavelength channel corresponding to the VLC terminal according to the available wavelength channel information and the current channel allocation condition,
when a currently allocatable time slot exists, a wavelength channel is not allocated.

* * * * *